(12) United States Patent
Novotny et al.

(10) Patent No.: US 10,003,936 B1
(45) Date of Patent: Jun. 19, 2018

(54) GRAPHICAL MESSAGING SOFTWARE APPLICATION AND FEATURES THEREOF

(71) Applicant: Innovators Atlas LLC, Green Bay, WI (US)

(72) Inventors: Darryl C. Novotny, De Pere, WI (US); Jeffrey D. Hitzler, Green Bay, WI (US)

(73) Assignee: Innovators Atlas LLC, Green Bay, WI (US)

( * ) Notice: Subject to any disclaimer, the term of this patent is extended or adjusted under 35 U.S.C. 154(b) by 0 days. days.

(21) Appl. No.: 15/480,064

(22) Filed: Apr. 5, 2017

Related U.S. Application Data

(60) Provisional application No. 62/318,594, filed on Apr. 5, 2016.

(51) Int. Cl.
*H04W 4/00* (2018.01)
*H04W 4/12* (2009.01)
H04W 84/04 (2009.01)

(52) U.S. Cl.
CPC ............ *H04W 4/12* (2013.01); *H04W 84/042* (2013.01)

(58) Field of Classification Search
CPC .............................. H04W 4/12; H04W 84/042
USPC .............................................. 455/466, 550.1
See application file for complete search history.

(56) References Cited

U.S. PATENT DOCUMENTS

| 8,180,274 | B2 | 5/2012 | Bender |
| 8,452,646 | B2* | 5/2013 | Levi .................. G06Q 30/0241 |
| | | | 705/14.4 |
| 8,832,552 | B2 | 9/2014 | Arrasvouri et al. |
| 9,014,660 | B2 | 4/2015 | Pahlevani |
| 9,232,367 | B1 | 5/2016 | Singleton et al. |
| 9,883,360 | B1* | 1/2018 | Haney .................... H04W 4/14 |
| 2003/0009385 | A1* | 1/2003 | Tucciarone .......... G06Q 10/107 |
| | | | 705/26.1 |
| 2009/0325609 | A1* | 12/2009 | Rosen ..................... H04L 51/36 |
| | | | 455/466 |
| 2010/0022270 | A1* | 1/2010 | Mikkelsen ............. G06Q 30/06 |
| | | | 455/556.1 |
| 2010/0159965 | A1* | 6/2010 | Pascal .................. H04L 51/066 |
| | | | 455/466 |
| 2011/0038287 | A1* | 2/2011 | Agarwal ................. H04L 51/20 |
| | | | 370/310 |
| 2011/0191432 | A1* | 8/2011 | Layson, Jr. ............ G06Q 30/02 |
| | | | 709/206 |
| 2014/0379813 | A1* | 12/2014 | Charania ................ H04L 51/02 |
| | | | 709/206 |

OTHER PUBLICATIONS

U.S. Appl. No. 62/246,576, filed Oct. 16, 2015, 1 page, United States.
U.S. Appl. No. 62/247,152, filed Oct. 27, 2015, 1 page, United States.

* cited by examiner

*Primary Examiner* — Khai M Nguyen
(74) *Attorney, Agent, or Firm* — Stephen C. Jensen; Northwind IP Law, S.C.

(57) ABSTRACT

A graphical messaging software application, and numerous aspects and features thereof, are described in detail.

21 Claims, 27 Drawing Sheets

GRAPHICAL MESSAGING SOFTWARE APPLICATION AND FEATURES THEREOF

CROSS-REFERENCE TO RELATED APPLICATIONS

This application claims priority under 35 U.S.C. § 119(e) to provisional patent application U.S. Ser. No. 62/318,594, "Graphical Messaging Software Application and Features Thereof", filed Apr. 5, 2016, the contents of which are incorporated by reference.

FIELD OF THE INVENTION

The disclosed inventions relate generally to software, with particular application to software applications that can generate, transmit, and deliver graphic-based messages (sometimes referred to as infographic messages), and display such messages and related information on the display of a portable electronic device and other electronic devices. The inventions also relate to associated articles, systems, and methods.

BACKGROUND

Numerous software products are known that can generate, transmit, and process messages, and display them on the screen of a computer, tablet, mobile phone (including smart phones), or other electronic device. Examples include Microsoft™ Outlook and Apple™ Mail, each of which has been in use on desktop computer platforms for many years. More recently, smart phones and other mobile phones are sold with a pre-loaded suite of applications or capabilities, including messaging software. The mobile phone messaging software allows users to send text messages and multimedia messages to other users on the cellular network. Social media sites such as Facebook™, Twitter™, and SnapChat™ also provide messaging capabilities. Still other known messaging software includes: Alert Solutions K-12 School Notification Systems; One Call Now; K12 Alerts™; Remind; Ez Texting; Benbria BlazeCast™; Call-Em-All; Blackboard; Everbridge; Kaymbu; SchoolMessenger™; Regroup; Elerts™; e2Campus; Rave Alert; Rave Messenger (AT&T); Rapid Notify; Red Alert; 911 Cellular; CallFire; and ParentREACH™.

BRIEF SUMMARY

We describe herein a graphical messaging software application, and numerous aspects and features of such software.

In one such feature, a computer-implemented method of delivering graphic-based messages from one or more subscriber-users to a non-subscriber user of a messaging software system is disclosed. The method may include: defining a predetermined set of message categories; associating messages created by the one or more subscriber-users with one or more of the message categories; defining user preferences for the non-subscriber user, including designating at least a first message category from the set of message categories that the non-subscriber user wishes to receive; monitoring the non-subscriber user's responses to graphic-based messages received by the non-subscriber user in relation to at least some of the message categories in the predetermined set; in response to a plurality of negative actions of the non-subscriber user relative to received graphic-based messages in the first message category, querying the non-subscriber user regarding whether the non-subscriber user wishes to continue receiving messages in the first message category; and if the non-subscriber user responds to the query by indicating the non-subscriber user does not wish to continue receiving messages in the first message category, revising the user preferences to remove the first message category from the set of message categories that the non-subscriber user wishes to receive.

Many other aspects and features of the software are also described. Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
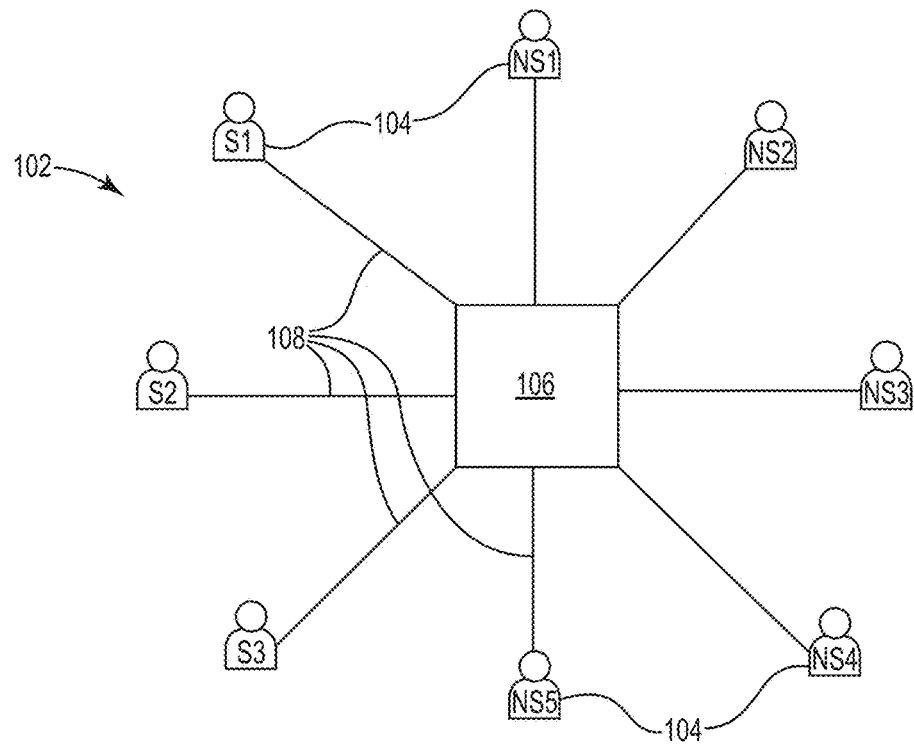
FIG. 1 is a schematic diagram showing a network in which users of the messaging software are linked together through a network infrastructure.

Software features are presented in the context of software that is designed to facilitate electronic device-based messaging between users of the software. The disclosed software features are all capable of being incorporated into a single software product, such as an application or "app" that can be loaded and used on a conventional smart phone, tablet, laptop computer, or other conventional mobile or portable electronic device. However, in other cases, only some, or only one, of the disclosed features may be incorporated into a given messaging software product.

The disclosed software, as implemented on smart phones or other electronic devices capable of communicating with each other on currently available or later developed communications networks and related infrastructure, can be characterized as a media delivery system, or a universal messaging system, or a communications platform. The messages that are generated, transmitted, and delivered by the software are graphical in nature, for example, the messages may be described as "infographic" (information graphic), as distinguished from purely text messages (e.g. Short Messaging Service (SMS) text messages of 160 characters or less) which do not allow for graphics or images to be included in the message, but also distinguished from messages that consist only of a photographic image. Infographic messages are graphic visual representations of information or data adapted to present information quickly and clearly to large numbers of people, and improve cognition by using graphics to enhance the human visual experience. The disclosed graphic-based messages are a type of Multimedia Messaging Service (MMS) message, and are preferably transmitted on the (digital) data channel of known or later developed cellular communications networks, rather than on SMS.

The disclosed messages can be of several different message types, for example, announcements, alerts, appointments, and advertising, but other message types are also contemplated. The software, as implemented on a suitable network of devices, can thus function as an alert system, an announcement system, an appointment system, or an advertising system, or a combination of some or all such systems. For example, as an alert system in the context of a school or university, a principal, teacher, or other staff member of the school may send an alert from such person's smart phone or other electronic device to other staff members, or to students of the school, or both, provided such other staff members or students are users of the software. As an announcement system, the messaging software can allow school staff to notify students and parents of planned events or activities. As an appointment system, the software can facilitate the setup of meetings between parents, students, and staff. As an advertising system, the software can disseminate extracurricular information to parents and students. Although the software is well adapted for use in schools and educational settings, it is by no means limited to that market sector, and can also be used in other sectors, such as business, industry, institutions, and with individuals.

Preferably, at least some of the disclosed graphic-based messages are configured to appear as a full "wallpaper" image when delivered to a smart phone, or, stated differently, as a graphic image that substantially fills the working background area of the display screen of a smart phone. This message configuration promotes direct, immediate, and effective messaging to the target recipients. The disclosed graphic-based messages and their delivery method also helps to reduce the noise or clutter of emails, texts, notifications, and other digital media on a user's smartphone. In this regard, conventional texts and email messages are being ignored by the public with increasing regularity, and thus are losing their effectiveness. The disclosed graphic-based messages are distinguishable from known messaging techniques by one or more of the following: the graphic-based message is easy to see, easy to understand, and easy to use; the messages are transmitted on the data channel of existing or later developed cellular communications networks; and the software limits access for who can generate and send messages to a select group of users, namely, subscribers, as described further below. The disclosed messaging software can also provide valuable feedback information such as confirmation to the sender that the recipient of a message has in fact seen and taken some specific action in response to the message, such as opening, saving, deleting, forwarding, or ignoring the message.

The messaging software distinguishes between two types of users: subscribers and non-subscribers. Subscribers, sometimes referred to herein as providers, refers generally to users that are given the ability to create and send the graphic-based messages. Non-subscribers, sometimes referred to herein as followers, refers generally to users that are not given the create/send ability, but instead are recipients of at least some messages generated by the subscribers within the framework of the software. A given non-subscriber (abbreviated "NS") may for example be a student at a school whose administration has become a subscriber-user of the software, or a patient of a doctor's office that has become a subscriber-user of the software, or an employee of a business whose executive group has enrolled the business as a subscriber-user of the software. The software makes it possible for a subscriber to build a public or private following of persons or groups that are interested in receiving graphic-based messages such as announcements, alerts, and so forth from the subscriber.

Embodiments and implementations of the messaging software may thus be used to:

deliver pertinent information from schools to students, parents, faculty, and staff quickly, and with message delivery confirmation;

provide effective infographic information, chosen by the user, provide a direct link from an institution to each of its followers, such as a student, customer, or constituent;

improve the effectiveness of alerts such as lockdowns, threats, Amber alerts, Silver alerts, and health alerts;

give institutions control and accountability for the message sent, such as controlling who receives it and confirming who reads it;

provide an advertising delivery method that is targeted, efficient, and cost effective;

provide an appointment notification system that improves effectiveness, efficiency, and confirmation, as discussed further below;

eliminate the "noise" from emails, texts, and notifications on a smart device;

give an NS user the ability to privately share an infographic message with another user;

give an NS user the ability to have infographic messages in the form of discount coupons and the like to be saved on the smart device;

give institutions the convenience to contact their followers to complete timely tasks with accountability;

give national institutions the ability to target their audience;

improve the user experience and effectiveness of smart devices by reducing the "noise" the owner chooses to hear;

give an institution the power to ensure its messages will reach all of its followers (NS users) immediately, with confirmation;

give an institution control over the urgency of its messages; and provide an easy to use, convenient communication tool that is customized to the user's lifestyle.

We will now provide some guidance on certain terms that are used throughout this document. The term "appointment book" may refer to a calendar representation of a unique scheduled resource, and may also include rules and defaults associated with the scheduling of appointments. The term "closed group" may refer to a managed set of NS users (followers), such group being defined and maintained by a given subscriber. The term "follower" may refer to a user who has the disclosed software loaded as an application ("app") on his or her smart phone or similar portable electronic device having access to the internet, or the cellular network, or both, and who may log on to the software app or a portal thereof, and choose to accept messages from (i.e., follow) one or more subscriber-users. The term "industry" may refer to a type of business with unique communication requirements. A "graphic-based message" may refer to a visual notification (and its counterpart representation as a digital file, packet, or signal) that is defined by a subscriber-user for delivery to one or more NS users, that is graphical or drawing-based (as distinguished from textual or text-based) in nature, and that is configured as a full-screen image when viewed on the screen of a smart phone. The term "portal" may refer to a secure and unique HTML URL used to manage a subscriber-user's content and settings. The term "template" may refer to base artwork and settings used as a starting point for a subscriber to create any of the graphic-based messages disclosed herein. The term "provider" or "subscriber" may refer to a user who the software permits to create, schedule, and send the graphic-based message; the provider may also subscribe to a paid program based on industry to create, schedule, and send such messages. The term "touch" or "touched" may refer to the touching or clicking by an NS user of a graphic-based message delivered by the disclosed software, for example on such user's smart device.

The term "administrator" as used in this document may have several meanings due to the fact that the disclosed software can be configured to recognize different types of administrators. In some cases this is a consequence of the fact that a "subscriber" is actually a subscriber group, e.g., a group of individuals who are all part of a given subscriber organization, e.g. church, school, company, or the like. The number of individuals in the subscriber group may be small, e.g. 2 or 3 in the case of a small business, and in other cases large, e.g. dozens of people or more who are part of the staff or control group of a school or college. (Students of such school or college would typically be NS users of the software, i.e., they would not be considered part of the subscriber group. They would be considered followers of the subscriber (school).)

With this in mind, the term "workflow administrator" may refer to a person (user) who is part of a subscriber group, and who has gatekeeper authority for outgoing messages for that subscriber. This person can thus approve, reject, modify, etc. the proposed graphic-based message before it can be sent. This person is specific to a given subscriber. Each subscriber can define its own workflow administrator. The workflow administrator for a given subscriber (e.g. subscriber "A") has no gatekeeping authority for other subscribers of the software (e.g. subscribers "B", "C", "D", etc.). In some cases, a subscriber may choose not to designate any workflow administrator.

The term "scheduling administrator" may refer to a person who is part of a subscriber group, and who has gatekeeping authority and responsibility with regard to the calendar and scheduling of appointments for the subscriber. For example, the number of times an NS user (follower) may select reschedule may be set by the scheduling administrator of a subscriber. In some cases, a subscriber may choose not to designate any scheduling administrator.

The term "portal administrator" may refer to a person (user) who is part of a subscriber group, and who has gatekeeping authority over the entire portal for the subscriber. That is, the portal administrator may have gatekeeping authority that supercedes the authority of the subscriber's workflow administrator and scheduling administrator. The subscriber group may designate which person of the organization will be the portal administrator. In some cases, the workflow administrator, scheduling administrator, and portal administrator may be three different people within the subscriber organization, while in other cases, those administrative functions may be given to a single person.

The term "system administrator" refers to a person associated with the software application per se, and may not be associated with any subscriber. This person may be a user of the software, e.g., a non-subscriber, or the person may not be a user of the software but may instead simply administer the daily operation of the software. The system administrator may have gatekeeping authority over all subscribers—which means over all workflow administrators, scheduling administrators, and portal administrators—as well as over all NS users.

Turning to FIG. 1, we see there a schematic diagram showing an overview of an embodiment of the disclosed messaging software 102 in which users S1 through S3 and NS1 through NS5 of the messaging software are communicatively connected to each other via a communications network infrastructure 106, such as an existing cellular network, the world wide web (internet), or the like, or combinations thereof. Graphic-based messages as disclosed herein are transmitted by the software 102 over communication links 108, at least some of which are or comprise the data channel of an existing cellular communications network. The software 102 gives the users S1 through S3, who are subscriber-users, the tools and authority to create (generate), transmit, and deliver graphic-based messages to a message repository defined by the software and resident on a memory device of a computer server or similar machine (e.g. included in the network infrastructure 106). Those messages are then delivered to non-subscriber (NS) users NS1, NS2, NS3, NS4, and NS5 in accordance with the user preferences associated with these individuals. For example, user NS1 may have a user profile that allows delivery of messages from S1 but not S2 or S3, or the user profile may allow delivery of messages from all of the subscribers S1, S2, and S3 but only within a limited predefined category of messages, e.g., messages that comprise discount coupons. The remaining NS users may have distinctly different user profiles that specify which of the subscribers each of them follow.

Figure 2:
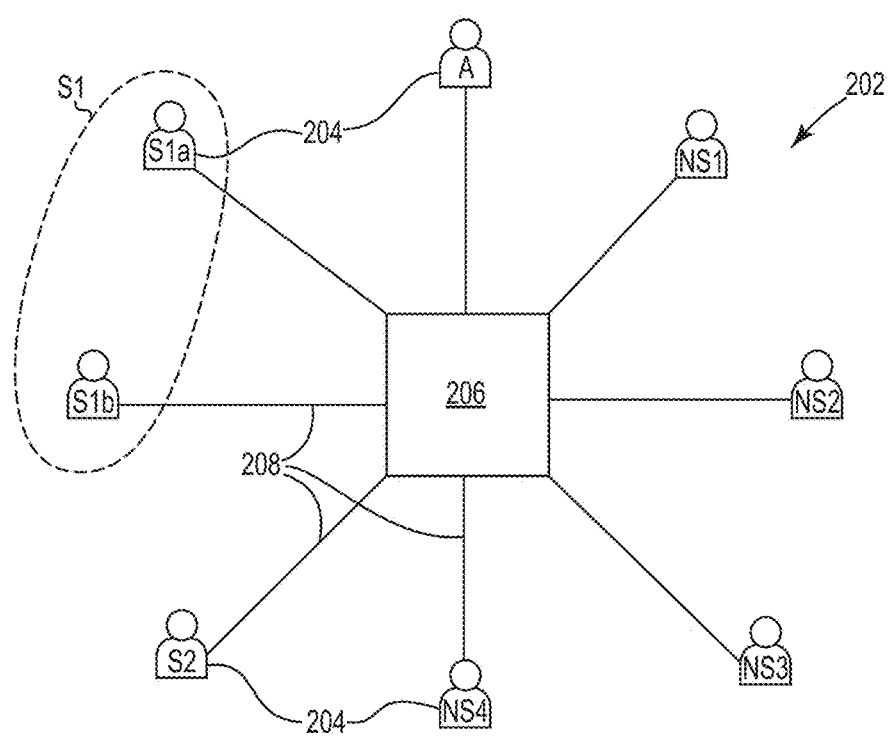
FIG. 2 is a schematic diagram similar to FIG. 1, but with a different assortment of users.

FIG. 2 is a schematic diagram of another embodiment of the disclosed messaging software 202. The embodiment of FIG. 2 is similar to that of FIG. 1 insofar as it also comprises users who are communicatively connected to each other via a communications network infrastructure 206 (which may be the same as or similar to the infrastructure 106), and whose graphic-based messages are transmitted by the software 202 over communication links 208 at least some of which are or comprise the data channel of an existing cellular communications network. The embodiment of FIG. 2 is shown to have a different assortment of users, namely: subscriber-users S1a, S1b, and S2; non-subscriber users NS1 through NS4; and an administrator A. The role of administrators within the context of the software is discussed elsewhere herein. In FIG. 2, the individuals S1a and S1b are members of a subscriber group S1. In general, a subscriber may be made up on only one individual user, or a plurality of individual users. In the latter case, the software may assign different authorities to the various individuals in the group with regard to creation of messages, scheduling, oversight approval, and so forth.

Figure 3:
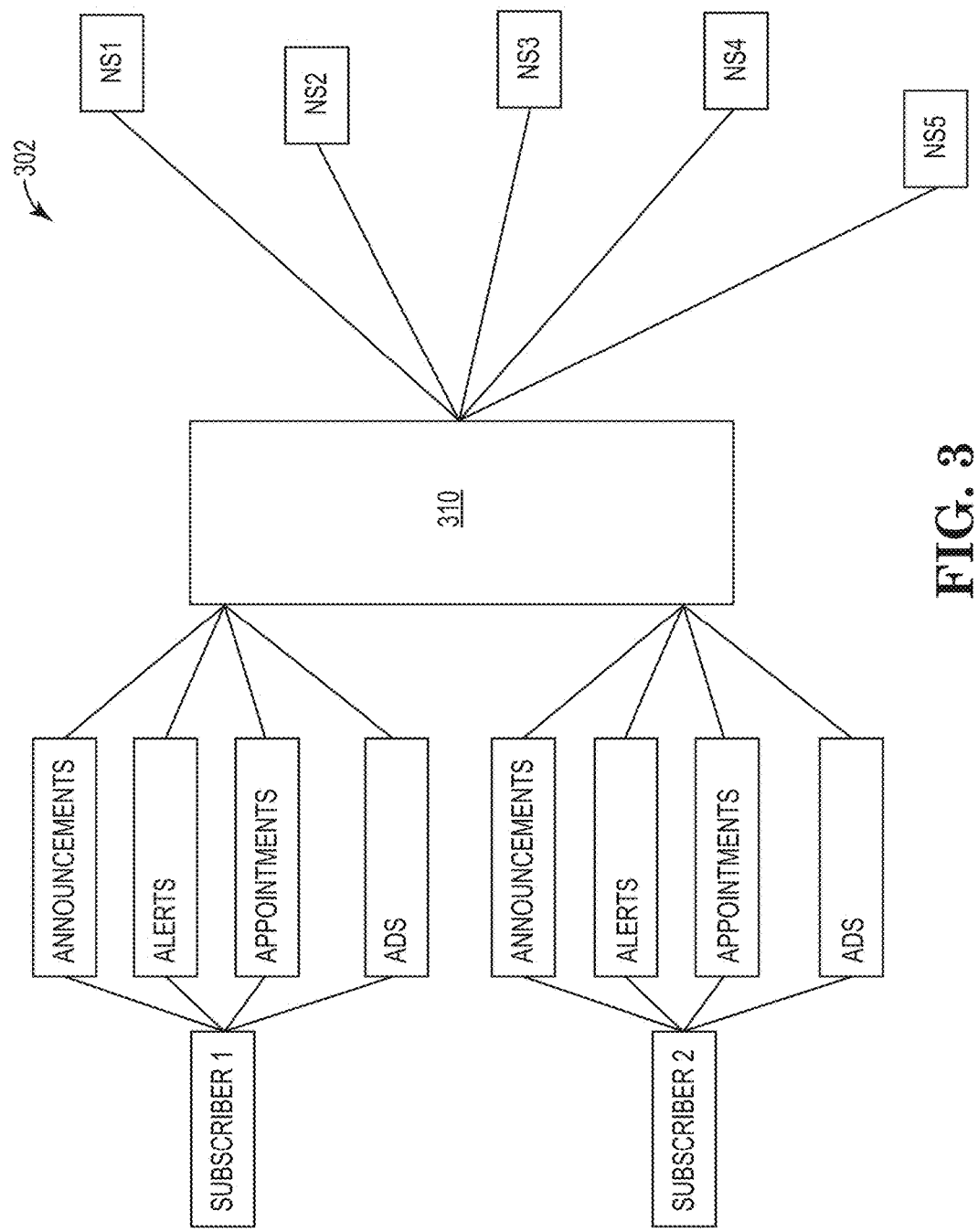
FIG. 3 is a schematic diagram similar to FIGS. 1 and 2, but further illustrating types of graphic-based messages supported by the software for subscriber-users.

FIG. 3 is a schematic diagram similar to FIGS. 1 and 2, but further illustrating some types of graphic-based messages supported by the software for subscriber-users. In particular, the software 302 provides two subscribers—Subscriber 1 and Subscriber 2—with the tools to create graphic-based messages in the form of announcements, alerts, appointments, and advertisements. The software further defines a repository or hub 310 that has sufficient memory storage capacity to store the messages created by the subscribers, and that can transmit and deliver the messages to one or more of the non-subscriber users NS1-NS5, as a function of the user preferences of such users.

Figure 4:
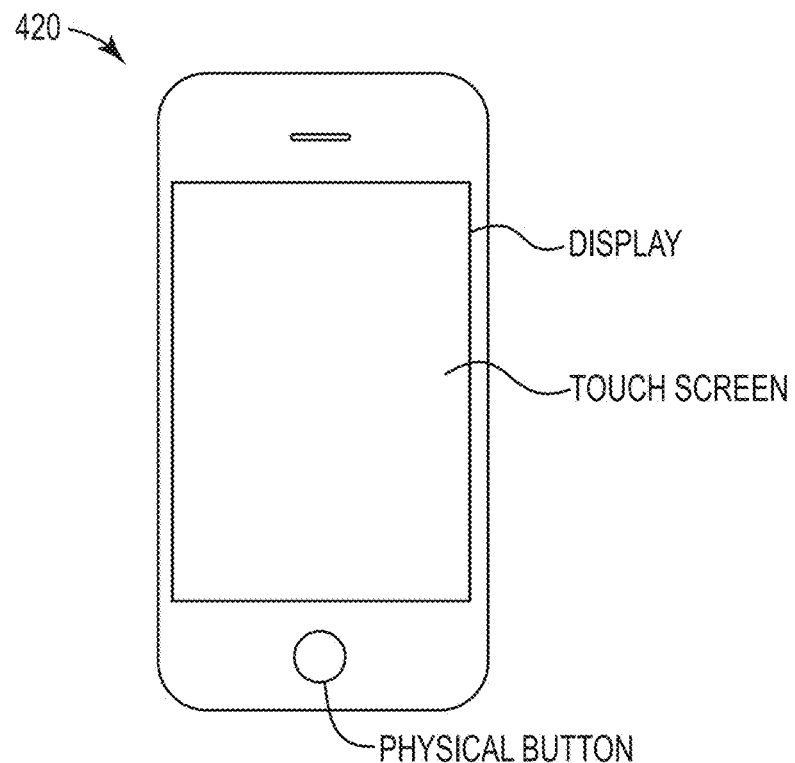
FIGS. 4 and 5 show representative electronic devices on which the software can be loaded and run to allow for user interaction with the software.
Figure 5:
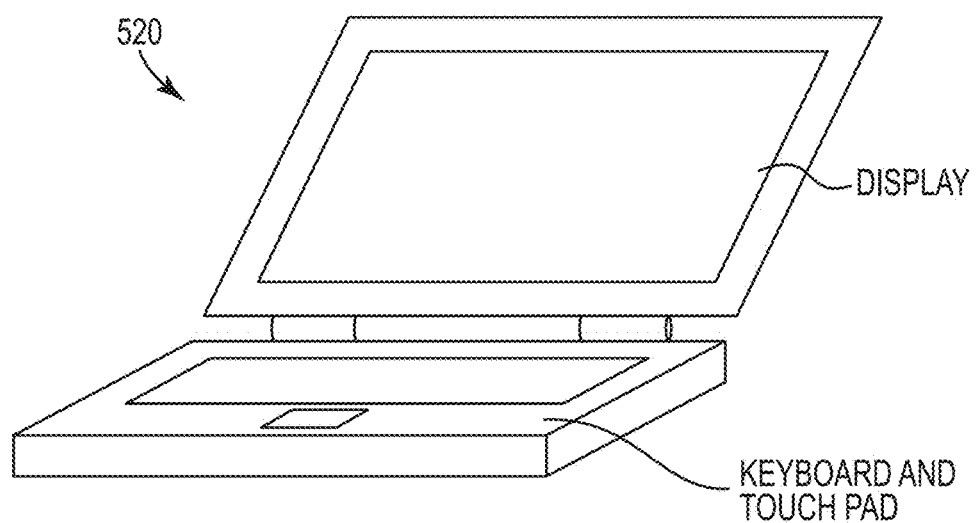

FIGS. 4 and 5 show representative electronic devices on which the disclosed software can be loaded and run to allow for user engagement and interaction with the software. FIG. 4 depicts a smart phone 420 having a display, a touch screen, and a physical button. FIG. 5 depicts a laptop computer 520, with a larger display than that of the smart phone, and user input features in the form of a keyboard and a touch pad. Other electronic devices can also be used with the disclosed software, such as tablet computers and even desktop computers. Regardless of the device chosen, the device typically has (1) a visual display on which the graphical user interface (GUI) of the software can be shown, (2) a user input device or feature, such as a touch screen, computer mouse, track ball, or touch pad, to allow the user to acknowledge receipt of the message or take some other action in response to the received message, such as by activating one or more virtual buttons on the display. The electronic device used to interact with the software also preferably includes suitable processors, memory, networks, and other known hardware, firmware, and software components to support the messaging software disclosed herein. The messaging software may be resident on portable electronic devices such as those of FIGS. 4 and 5, or on a central or distributed networking device (e.g. a cloud device), or both. The messaging software may also reside in whole or in part on any known or later-developed computer-readable storage medium, and it may be transmitted or downloaded to a target device by means of a stream of digital data whether over a wire or wirelessly.

Figure 6:
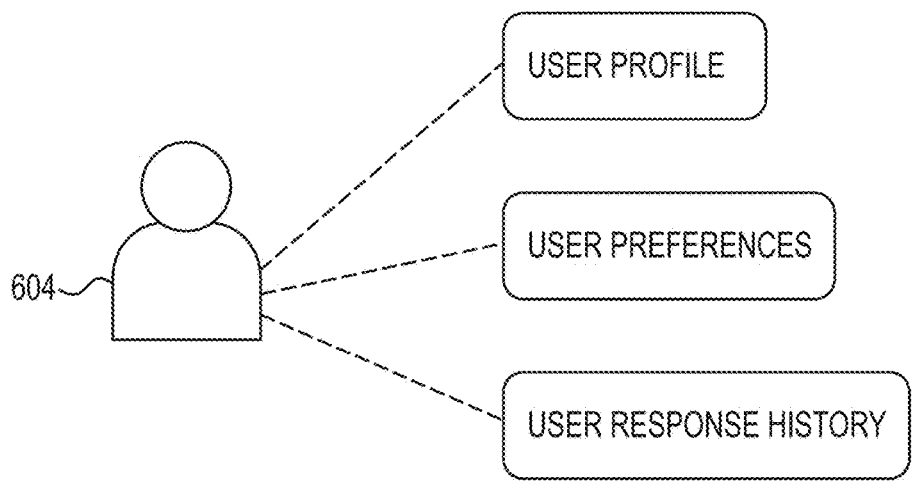
FIG. 6 shows a non-subscriber user and related attributes stored by the software.

An NS user 604 of the disclosed software is shown schematically in FIG. 6. This figure illustrates how the software associates with the user 604 certain attributes which determine how the user 604 interacts with the software. Specifically, the software may define a user profile, user preferences, and a user response history for each such user 604. The user profile may contain personal identification information, photographs, images, avatars, or other renditions of the user, billing information, and the like. The user profile may also contain indications of whether the user 604 is a subscriber, non-subscriber, or administrator. The software may further define user preferences for the user 604. In the case of an NS user 604, the user preferences may be or comprise a list of subscribers or categories that the user 604 wishes to receive messages from. For example, if the user 604 is a student at a school, the user preferences may designate that all messages originating from that school should be delivered to that user. In some cases, the user preferences may be considered to be a part of the user profile.

The software may also associate with the user 604 a user response history, sometimes referred to herein as a touch report. Like the user profile and the user preferences, the user response history may be or comprise a digitally formatted computer-readable data file, and these files may be stored locally on the user's smart phone or other digital device, and may also be stored or replicated on a remote server that supports and runs administrative aspects of the messaging software. The user response history may be continuously and immediately updated, for example, at the same time the user takes any type of action e.g. in the form of a touch or click on options relating to one or more received messages. When implemented in this way, the user response history can provide valuable information to the system administrator, to subscribers, or to both.

For example, the software can continuously, or substantially continuously, monitor the user response history of some or all of the NS users, and based on that monitoring can send non-subscriber feedback information to the subscriber-users relating to the graphic-based messages the subscribers send, transmit, or post using the software. In this way, the software can provide a subscriber with detailed and rapid reports, feedback, or information on non-subscriber reaction or response to a given message sent by the subscriber, such as how many or which of the NS recipients have actually seen the message (as indicated by recipient actions taken with respect to the message) (alternatively referred to as confirmed message deliveries), how many or which of the NS recipients have not actually seen the message, and/or other information such as how many or which recipients have saved the message, how many have deleted the message, and so forth. The software can also generate and provide the subscriber with substantially real-time or up-to-date, aggregate statistics that relate to multiple messages (including all messages, or all messages within a specified category, or within a specified time period) that were sent, transmitted, or posted by the subscriber, such as an identification of which such message or messages resulted in the highest (or lowest) confirmed deliveries, which message or messages resulted in the highest (or lowest) "save" action, or "forward" action, or "like" action, or "ignore" action, by the non-subscriber recipients.

Other reports or key performance indicators (KPIs) that the software is configured to provide include one, some, or all of the following:

Categories Deleted: if an NS user (follower) deletes messages of a given category with a specified count, frequency, or other statistical measure, the software may prompt the user to delete the category. Stated differently, the software may use the user response history to query the user after the user has responded in a given way (e.g. negatively) relative to one or more messages, as explained further below in connection with FIG. 28. If the user responds to the query by clicking OK, i.e., agreeing to delete the category, the software may generate a report for the affected subscribers that identifies the user and the category deleted.

Messages Deleted: if NS users delete a message, the software may generate a report for affected subscribers that identifies which users and how many times the message was deleted.

Messages Saved: if NS users save a message, the software may generate a report for affected subscribers that identifies which users and how many times the message was saved.

Messages Sent: this report provides the number of graphic-based messages that have been sent, according to user and user group(s) (if any).

Messages Shared: this report provides the number of messages that have been shared by user.

Notifications per Day: this report provides subscribers with the total notifications per day from the NS user settings.

Shared to Social Media: this provides subscribers with the total number of subscriber-shared messages to Social Media.

Touch Report: after a message is obtained from a provider/subscriber, the NS user (follower) touches or clicks the message. A touch report can be generated to show the total number sent vs. the total number "touched" for the given message, and can be used as confirmation that the NS user received the message.

Figures 7A, 7B:
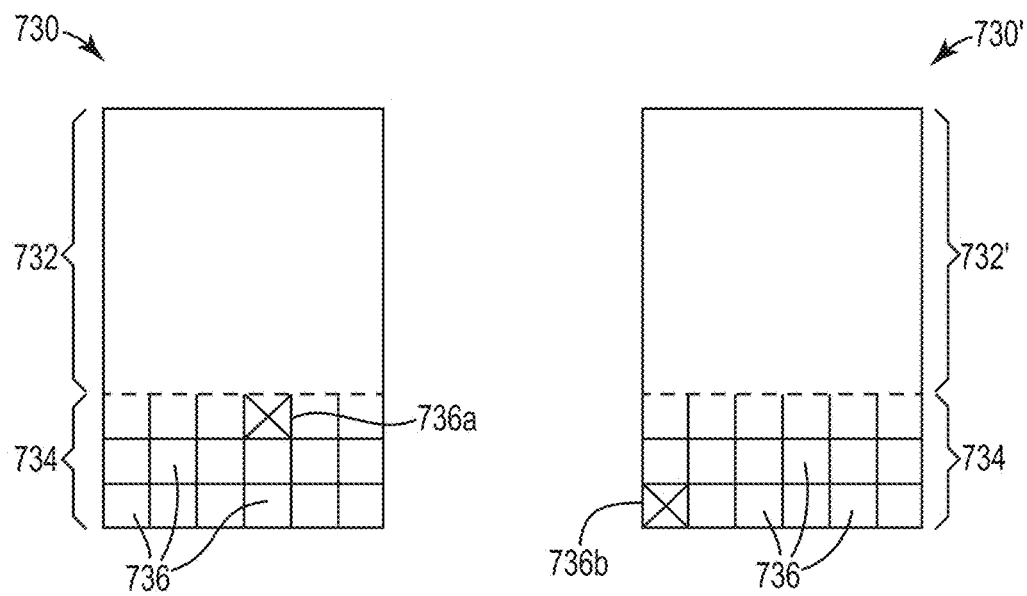
FIG. 7A shows schematically a representative graphic-based message, the message being tagged with or otherwise including a predefined category designator associated with the content of the message.
FIG. 7B shows schematically a message similar to that of FIG. 7A, but having a different predefined category designator.

Turning now to FIGS. 7A and 7B, we see there schematic representations of graphic-based messages 730, 730' that are generated, transmitted, and/or delivered by the disclosed messaging software. Each message comprises two parts: a first portion 732, 732' which is visible to the user-recipient in the form of a graphic-based or infographic notification, e.g. that fills the screen of a smart phone device, and a second portion 734, 734 that designates one or more predefined categories that the message is tagged with. The category designation may for example be selected from a set of approved categories by the subscriber-user at the time the message is created. Thus, the message 730 is shown to be tagged with a first predefined category 736a selected from a set of possible (approved or defined) categories 736, while the message 730' is tagged with a (different) second predefined category 736b from the set of categories 736. Preferably, the tagged category is associated with, or indicative of, the content of the information in the respective visible portion 732, 732' of the message. Designing the graphic-based messages in this way, such that a given message includes a detailed category designation, allows the followers to select which messages they are interested in with a finer or more precise granularity, i.e. with a greater specificity, compared to conventional systems wherein a recipient may be able to filter incoming messages only based on the identity (e.g. email address) of the sender of the message. The second portion 734 of the graphic-based message as disclosed herein, including the category that the message is tagged with (see e.g. 736a, 736b), may be embedded in metadata or other digital tags that form part of the digital file, packet, or signal that constitutes the graphic-based message. Furthermore, the second portion of the graphic-based message may in some cases be visible or detectable by an ordinary observer of the graphic-based message e.g. on the display screen of the user's electronic device, while in other cases the second portion of the message may not be visible or detectable.

The disclosed graphic-based messages such as messages 730, 730' may be produced and sent by a subscriber-user on an online provider portal. Such subscriber can use the disclosed software to produce its own infographic message, or choose from a list of defined templates. Using the software, the subscriber may choose to send the message immediately (subject to approval by one or more administrators, such as a workflow administrator, scheduling administrator, portal administrator, or system administrator), or may instead choose to send the message at a predetermined future scheduled time. Typically, the disclosed graphic-based messages have a digital file size of about 40 kilobytes (kB) to about 80 kB, but message sizes below or above that range are also possible. The graphic-based (infographic) message may in some cases include one or more of audio content, video content, and hyperlink content, while in other cases such content may be omitted from the graphic-based message.

In the process of preparing and sending a message, the subscriber may use the software to choose which non-subscriber uses to direct the message to. This choice may be made by specifying one or more NS user attributes, such as gender, age, place of residence, zip code, region, or other demographic attributes, special interest groups (SIGs) or other defined user groups, or the like. Such user attributes may be included in the user profiles of non-subscribers. The provider may also select or choose which message category or categories, within a set of predetermined categories (see categories 736 in FIGS. 7A, 7B) to assign to the message, based on the message content. Note that in some cases a message may not be delivered to, or retrieved by, a given user who would otherwise be a target of the message based on the subscriber-selected message attributes, in the event such user has a user preference setting that blocks or otherwise filters out the message.

Figure 8:
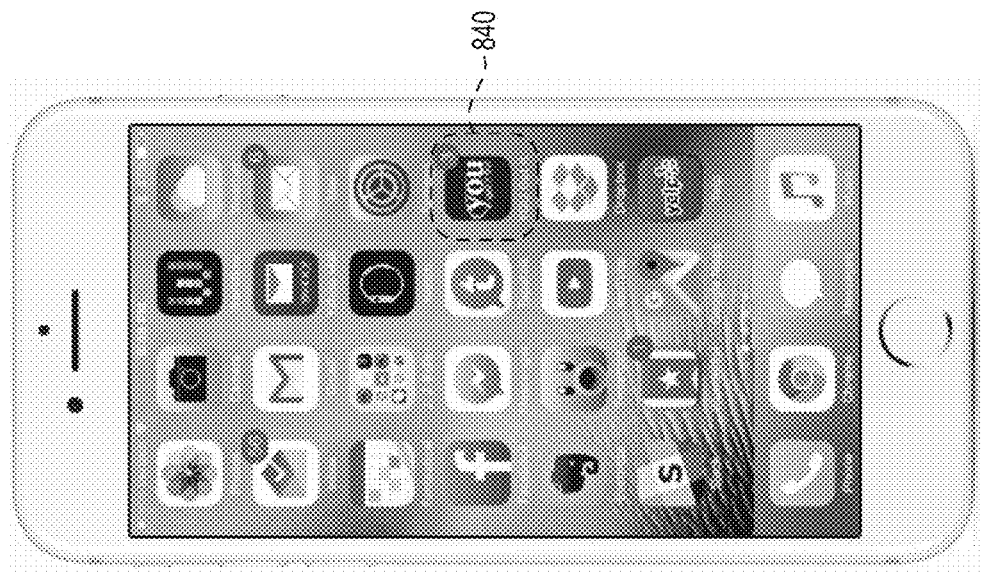
FIG. 8 shows an image of a smart phone with a home screen, the home screen having an array of icons, including an icon for the disclosed software.

The graphic-based messages that are sent from a subscriber to the smart devices of NS users may be received via one notification. When the notification is acknowledged by the non-subscriber, the messages from subscribers are immediately displayed in a queue (or cue). A series of small graphic circles or dots may be provided at the bottom of the message as an indication of the number of such messages in the queue. On the smart device main menu, an icon for the software appears, with the message queue count in the upper right hand corner of the icon, inside a red dot. An example of this is illustrated in FIG. 8 as icon 840, where the number "3" inside the upper right hand corner dot indicates three messages are in the queue. When the user touches or clicks the icon, the workflow returns to the message queue.

An NS user may activate their smart phone by pressing the power button. At this point, a notification from the software will appear. The user may slide the notification to proceed to the "unlock screen" of the phone, assuming this smart phone security feature is turned on. After the user enters the security code, the messaging software will display activated messages from subscribers (including subscriber groups) the user opted to follow in their user preferences or user profile. The user may then page through the queue of messages by swiping the screen to the left as though leafing through a book or queue. The software permits the user to leaf both forwards and backwards through the message queue.

The software GUI for smart phones may provide the NS user with a number of on-screen functions, such as Menu, Save, Share, Exit, and Delete, for use when the user is reviewing a given delivered message. These functions, which may in the form of virtual buttons that appear at the lower part of (or at any other suitable position on) the GUI screen, may be summarized as follows:

- the Menu function may include sub-functions such as Profile, Settings, Favorites, Explore, Featured, and Top-Rated;
- Profile General: user setup;
- Profile Following: a list of which subscribers (providers) the NS user chooses to follow; the NS user may be allowed to make changes to this list at any time;
- Settings: user ability to customize messaging allowed in;
- Favorites: received messages the NS user has chosen to save in Favorites;
- Explore: allows the NS user to explore and choose subscribers;
- Featured: allows the NS user to choose which subscribers (if any) whose messages will appear in front of other displayed messages;
- Top-Rated: allows the NS user to choose displays to subscribers;
- Save: upon selection of this function, the software may prompt the user to save an image of the message to the smart phone photos folder, or to the smart phone favorites folder,
- Share: share messages with the NS user's phone contacts (address book on the smart phone) and/or with the user's social media such as Facebook, Twitter, and Snapchat;
- Exit: takes the NS user to the main menu on the smart device; and
- Delete: deletes a message in the message queue.

With this background, we now turn the reader's attention to some specific examples of the disclosed graphic-based messages as they would be seen by a user on the display screen of a modern smart phone. These examples are illustrated in FIGS. 9-13, and are substantially self-explanatory, with little or no additional explanation needed.

Figure 9:
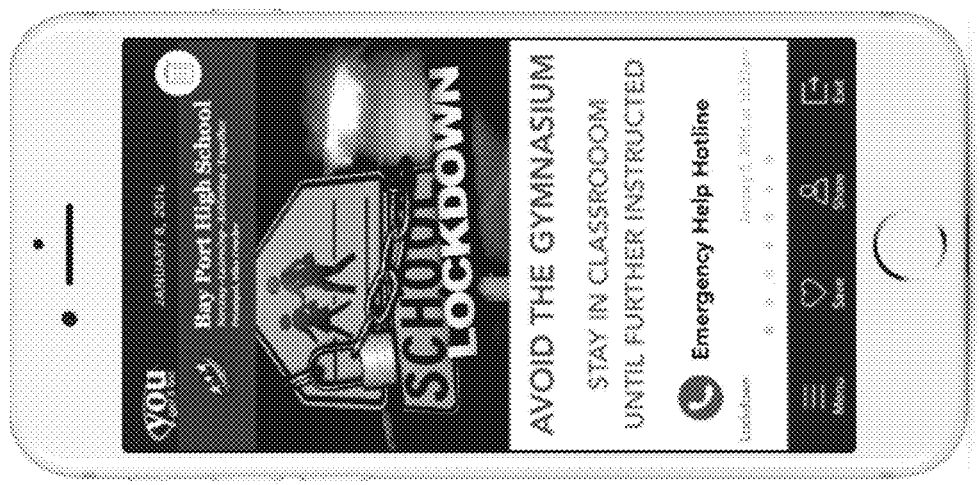
FIG. 9 shows an image of a smart phone with a graphic-based message for an alert.
Figure 11:
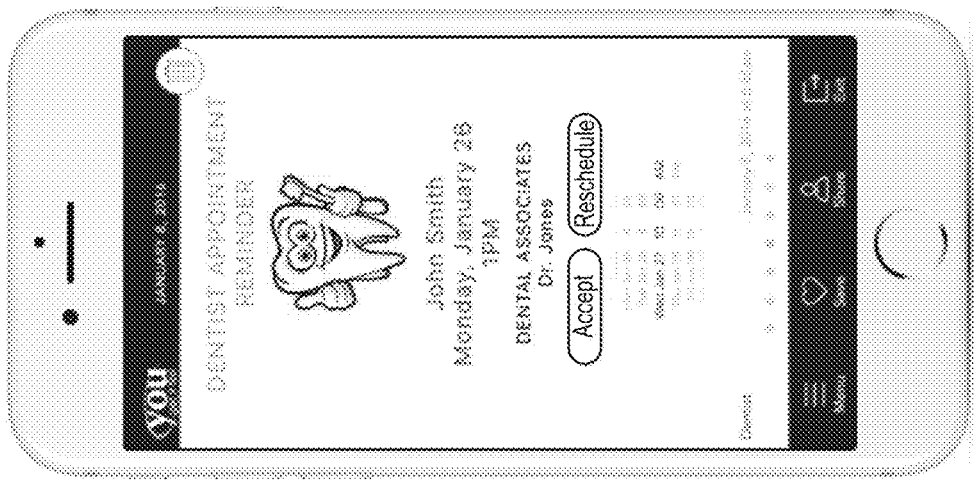
FIG. 11 shows an image of a smart phone with a graphic-based message for an appointment.
Figure 10:
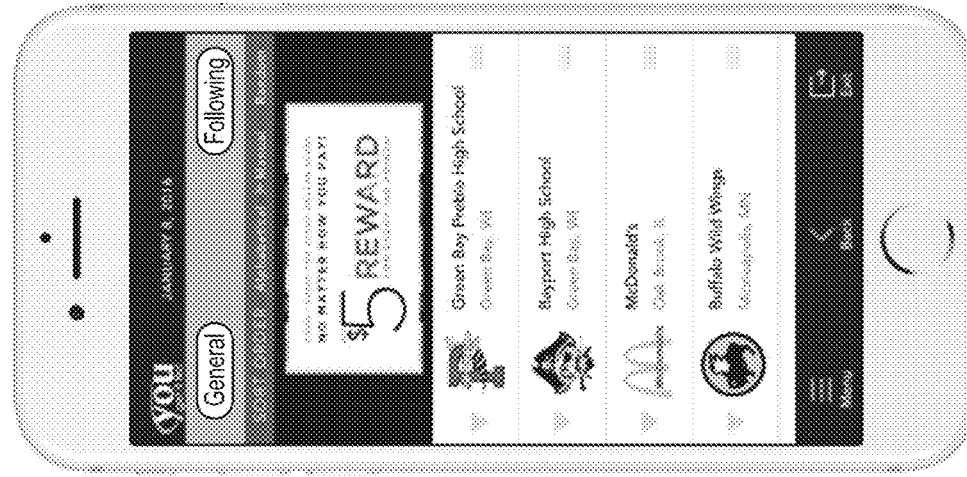
FIG. 10 shows an image of a smart phone with an information screen associated with the user profile of a non-subscriber user.
Figure 13:
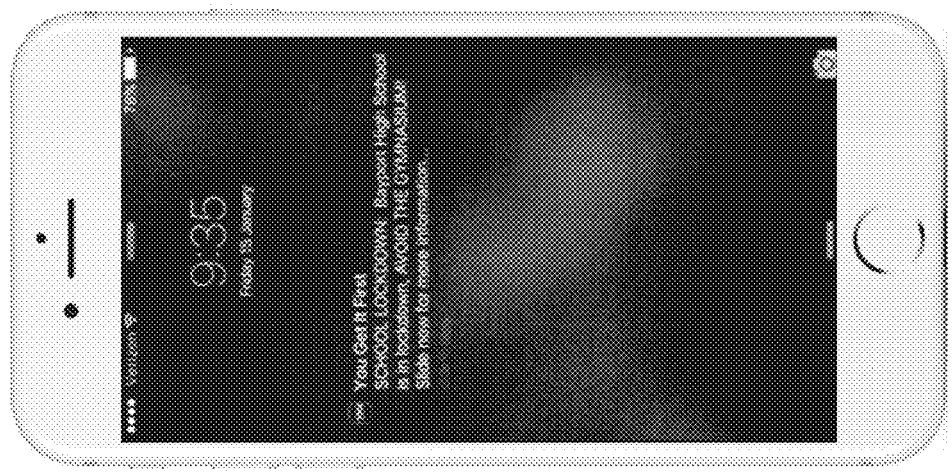
FIG. 13 shows an image of a smart phone with a graphic-based message for an alert.
Figure 12:
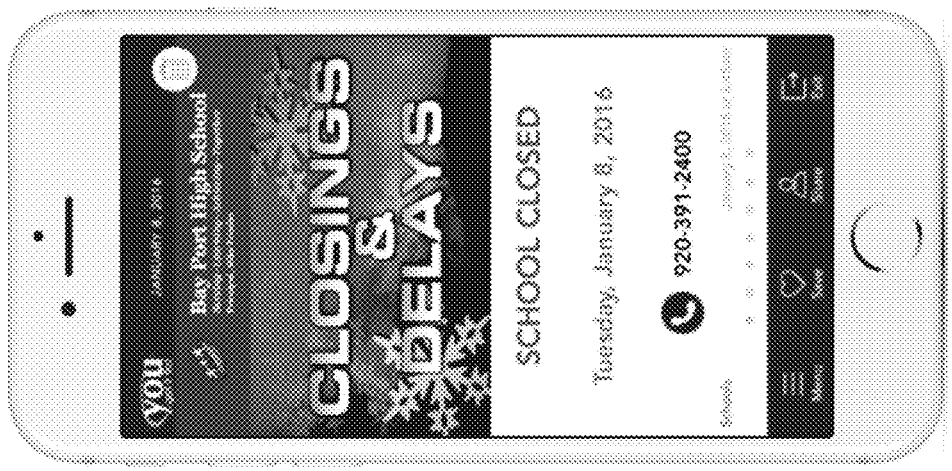
FIG. 12 shows an image of a smart phone with a graphic-based message for an announcement.

FIG. 9 shows a graphic-based message for an alert in connection with a hypothetical school lockdown situation. Note the Delete virtual button (depicted as a trash can) at the upper portion of the message, and the Menu, Save, Share, and Exit virtual buttons, with respective icons, in a row at the bottom of the message. FIG. 10 shows an informational screen associated with the user profile of an NS user, and includes a list of subscribers that the NS user has elected to follow. FIG. 11 shows a graphic-based message for an appointment with a dentist office subscriber. FIG. 12 shows an image of a graphic-based message for an announcement from a high school subscriber. FIG. 13 shows a graphic-based message for an alert from a school-based subscriber.

Figure 14A:
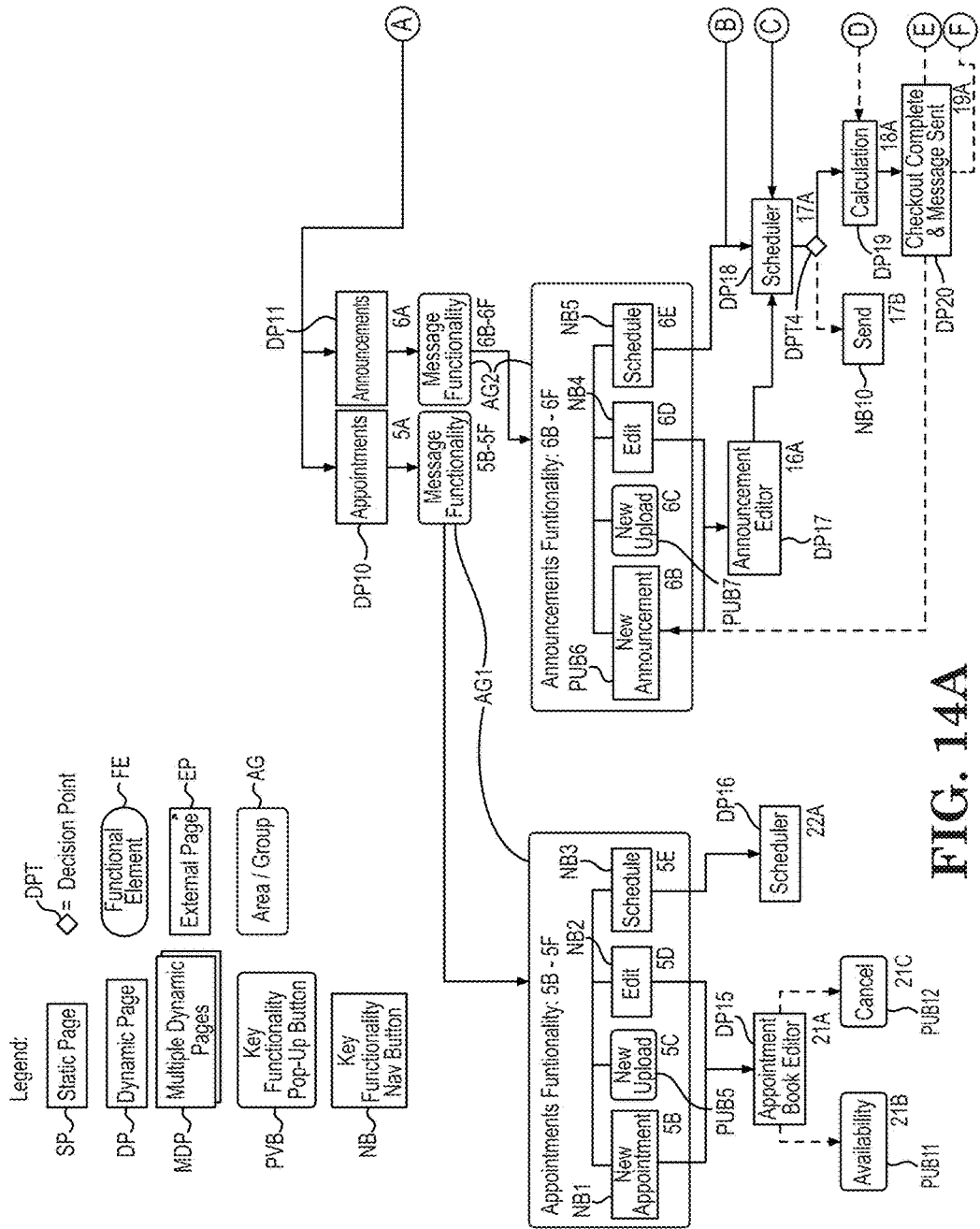
FIGS. 14A-14B (hereinafter collectively referred to as FIG. 14) depict a flowchart for a portion of the messaging software accessible to a subscriber/administrator.
Figure 14B:
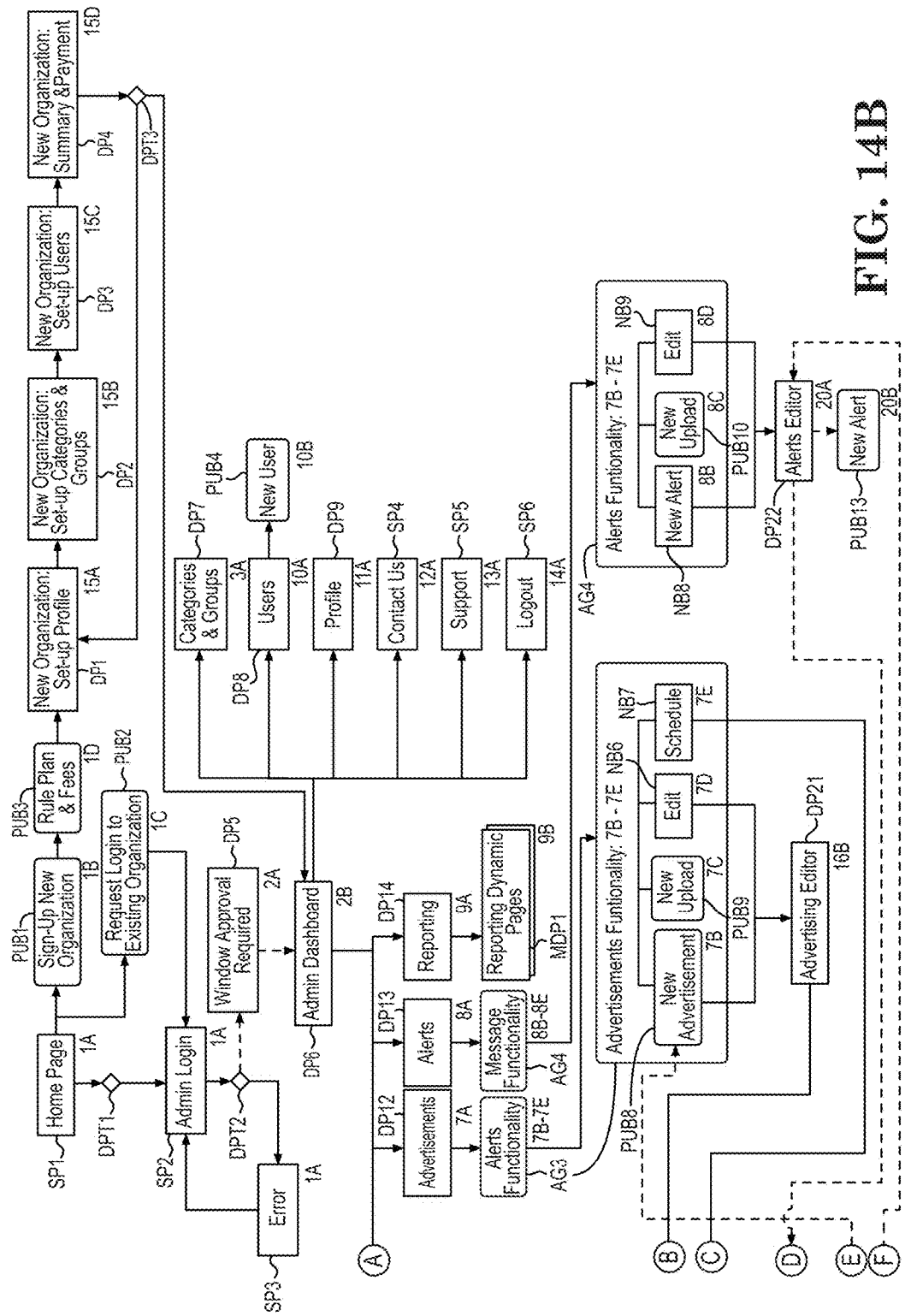
Figure 15A:
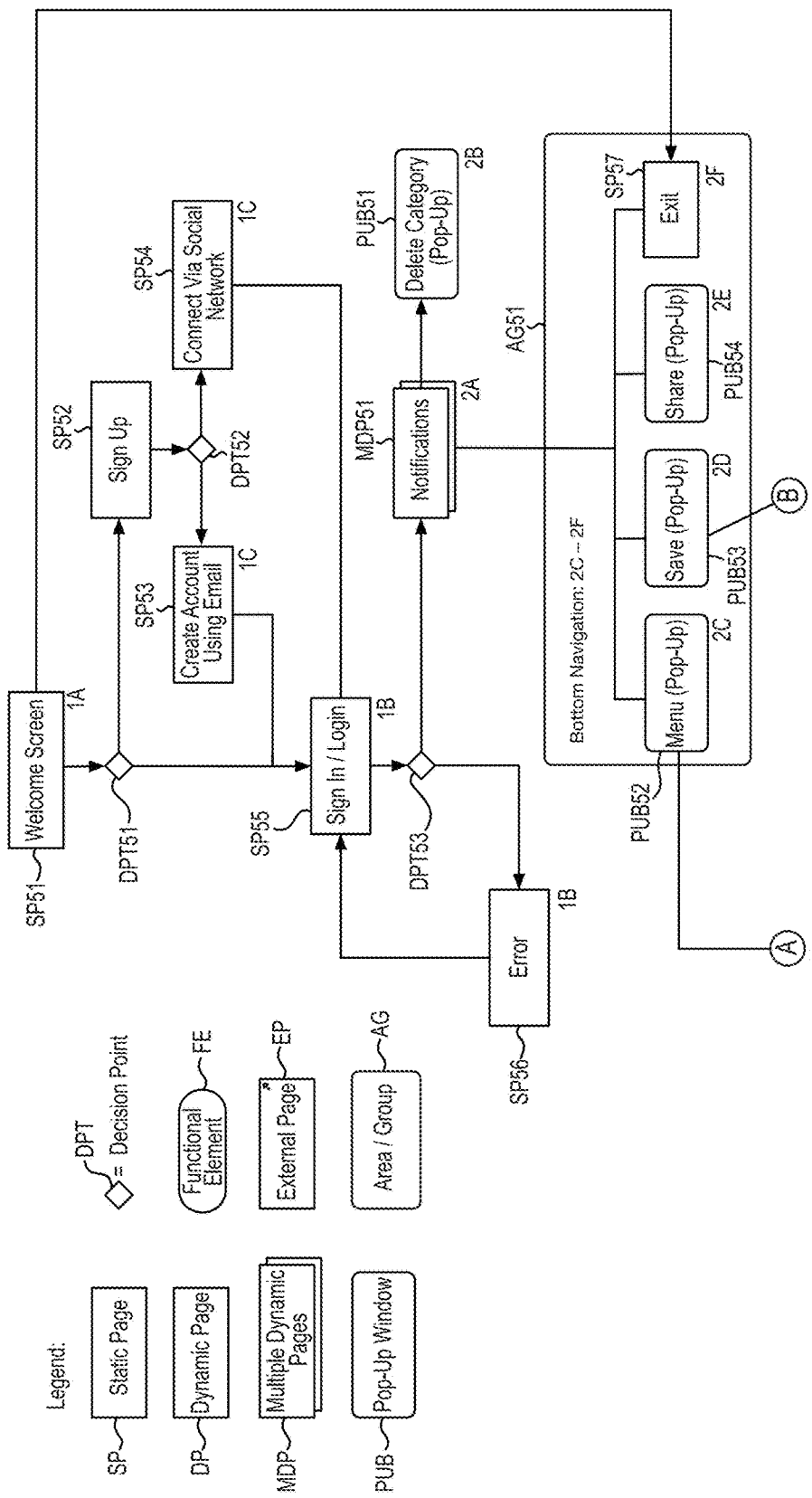
FIGS. 15A-15B (hereinafter collectively referred to as FIG. 15) depict a flowchart for a portion of the messaging software accessible to a non-subscriber user.
Figure 15B:
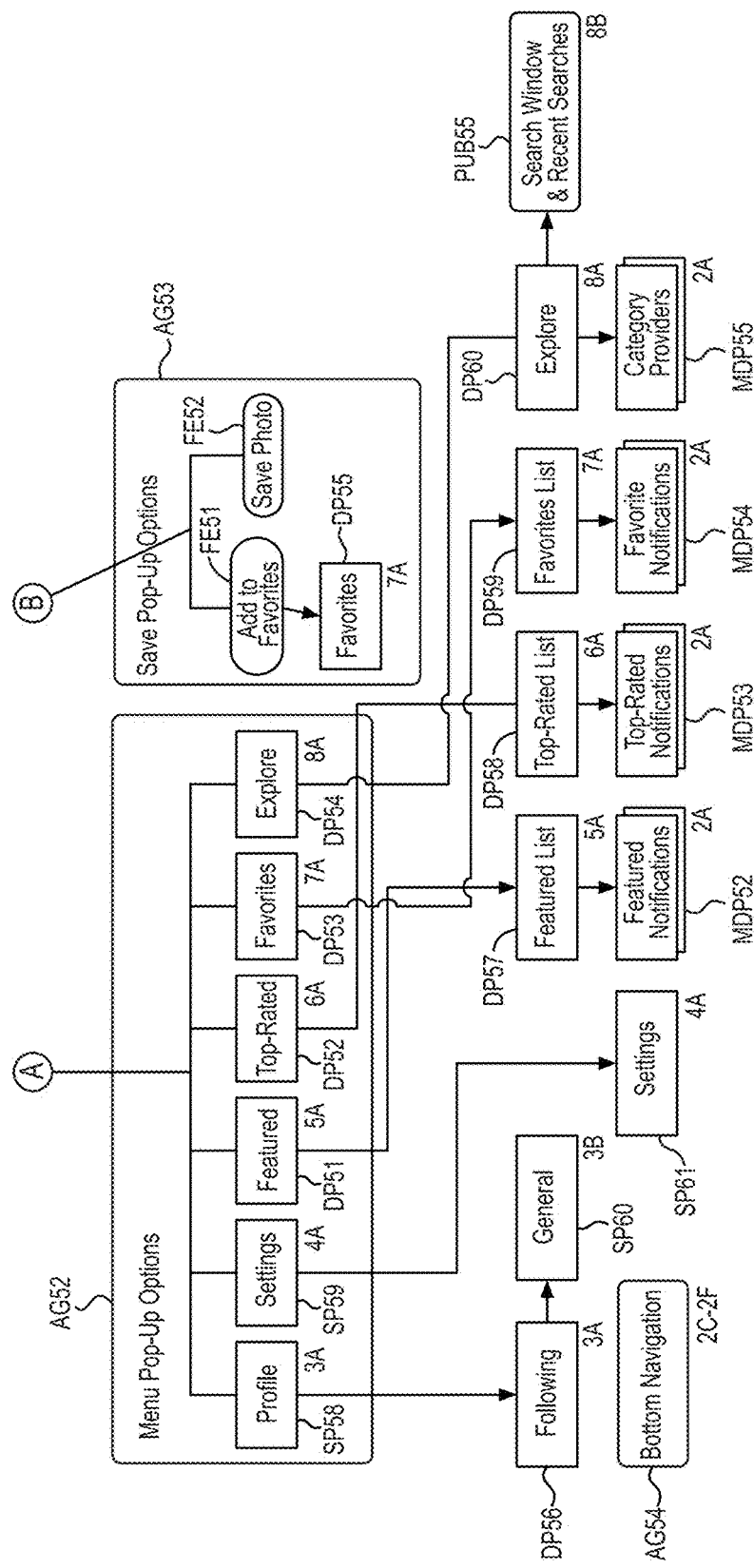

We now turn to FIGS. 14 and 15, which provide operational flowcharts associated with the messaging software. FIG. 14 is a flowchart for a portion of the messaging software accessible to a subscriber/administrator. FIG. 15 is a flowchart for a portion of the messaging software accessible to an NS user.

In FIG. 14, a legend is provided at the upper left to indicate the types of boxes and other symbols used in the flowchart. These types are as follows: SP refers to a static page; DP refers to a dynamic page; MDP refers to multiple dynamic pages; PUB refers to a key functionality pop-up button or pop-up window; NB refers to a key functionality navigation button; DP refers to a decision point; FE refers to a functional element; EP refers to an external page; and AG refers to an area/group. The boxes and symbols of FIG. 14 have the meanings provided below in Table 1. Given those meanings, and the arrangement of the boxes and symbols and their interconnections as illustrated in the figure, the reader will readily understand the operation of the flowchart, with no further explanation being necessary.

TABLE 1 box/symbol meaning for FIG. 14

| | | | |
|---|---|---|---|
| SP1 | Home Page | SP2 | Admin Login |
| SP3 | Error | SP4 | Contact Us |
| SP5 | Support | SP6 | Logout |
| DP1 | New Organization - Setup Profile | DP2 | New Organization - Setup Categories & Groups |
| DP3 | New Organization - Setup Users | DP4 | New Organization - Summary & Payment |
| DP5 | Workflow Approval Required | DP6 | Admin Dashboard |
| DP7 | Categories & Groups | DP8 | Users |
| DP9 | Profile | DP10 | Appointments |
| DP11 | Announcements | DP12 | Advertisements |
| DP13 | Alerts | DP14 | Reporting |
| DP15 | Appointment Book Editor | DP16 | Schedule |
| DP17 | Announcement Editor | DP18 | Scheduler |
| DP19 | Calculation | DP20 | Checkout Complete & Message Sent |
| DP21 | Advertising Editor | DP22 | Alerts Editor |
| MDP1 | Reporting Dynamic Pages | | |
| PUB1 | Sign Up New Organization | PUB2 | Request Login to Existing Organization |
| PUB3 | Registration & Fees | PUB4 | New User |
| PUB5 | New Upload | PUB6 | New Announcement |
| PUB7 | New Upload | PUB8 | New Advertisement |
| PUB9 | New Upload | PUB10 | New Upload |
| PUB11 | Availability | PUB12 | Cancel |
| PUB13 | New Alert | | |
| NB1 | New Appointment | NB2 | Edit |
| NB3 | Schedule | NB4 | Edit |
| NB5 | Schedule | NB6 | Edit |
| NB7 | Schedule | NB8 | New Alert |
| NB9 | Edit | NB10 | Send |
| AG1 | Appointment Functionality | AG2 | Announcements Functionality |
| AG3 | Advertisements Functionality | AG4 | Alerts Functionality |

In FIG. 15, a legend is provided at the upper left in like fashion to FIG. 14, and the SP, DP, MDP, PUB, NB, DP, FE, EP, and AG designators mean the same thing as in FIG. 14. The boxes and symbols of FIG. 15 have the meanings provided below in Table 2. Given those meanings, and the arrangement of the boxes and symbols and their interconnections as illustrated in the figure, the reader will readily understand the operation of the flowchart, with no further explanation being necessary.

TABLE 2 box/symbol meaning for FIG. 15

| | | | |
|---|---|---|---|
| SP51 | Welcome Screen | SP52 | Sign Up |
| SP53 | Create Account Using Email | SP54 | Connect via Social Network |
| SP55 | Sign In/Login | SP56 | Error |
| SP57 | Exit | SP58 | Profile |
| DP51 | Featured | DP52 | Top-Rated |
| DP53 | Favorites | DP54 | Explore |
| DP55 | Favorites | DP56 | Following |
| DP57 | Featured List | DP58 | Top-Rated List |
| DP59 | Favorites List | DP60 | Explore |
| PUB51 | Delete Category (Pop-Up) | PUB52 | Menu (Pop-Up) |
| PUB53 | Save (Pop-Up) | PUB54 | Share (Pop-Up) |
| PUB55 | Search Window & Recent Searches | | |
| FE51 | Add to Favorites | FE52 | Save Photo |
| AG51 | Bottom Navigation | AG52 | Menu Pop-Up Options |
| AG53 | Save Pop-Up Options | AG54 | Bottom Navigation |

We now turn to FIGS. 16 through 27, which illustrate examples of the messaging software GUI for use by a subscriber/administrator. These GUI images are substantially as they may be seen by a subscriber-user on the display screen of a tablet, laptop, or desktop computer, although they can be readily reconfigured and adapted for display on the smaller screen of a smart phone as well. These examples are sufficiently detailed and substantially self-explanatory, with little or no additional explanation needed.

Figure 16:
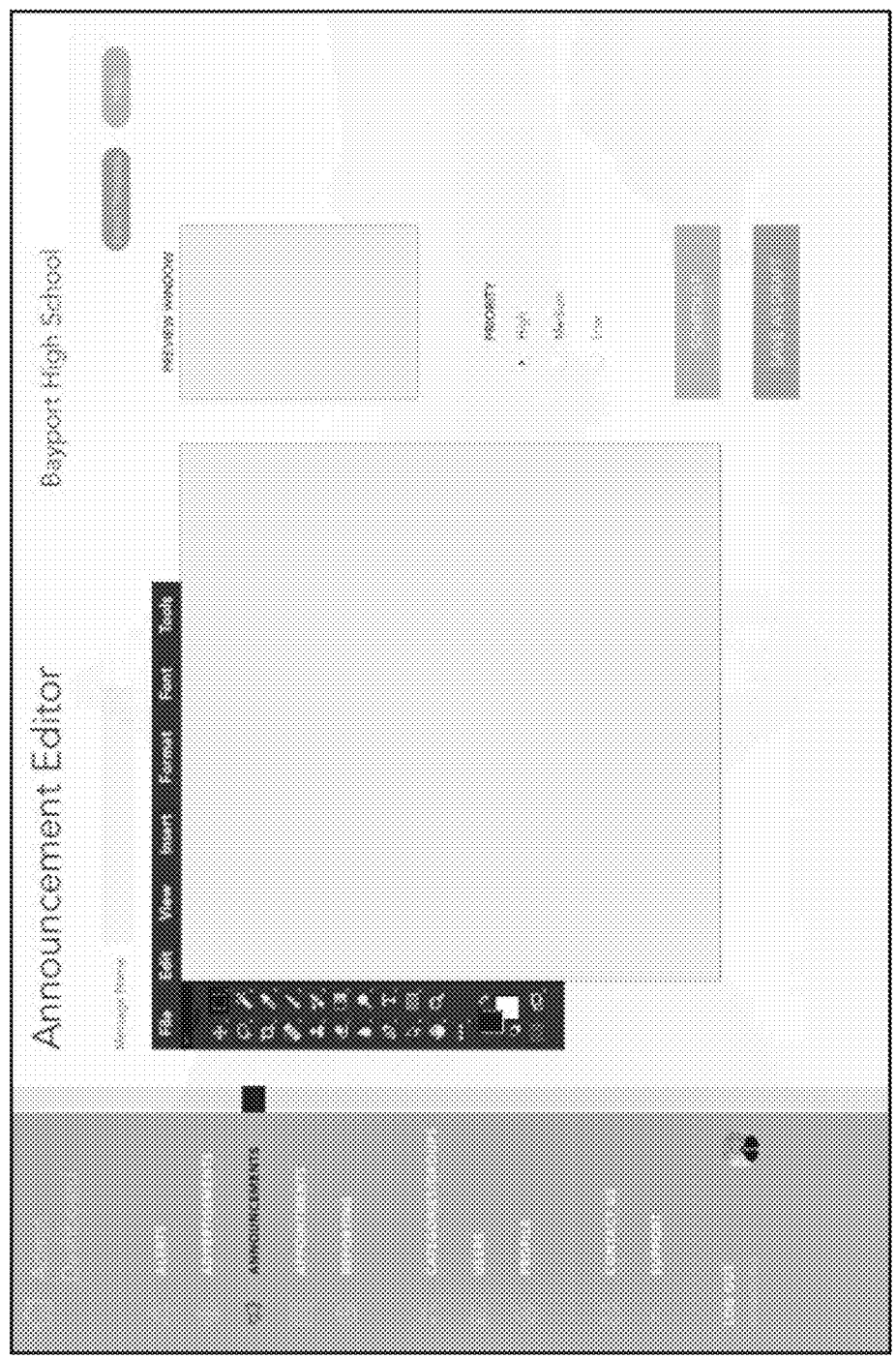
FIG. 16 shows a graphical user interface (GUI) of the software relating to announcements, for use by a subscriber/administrator.
Figure 17:
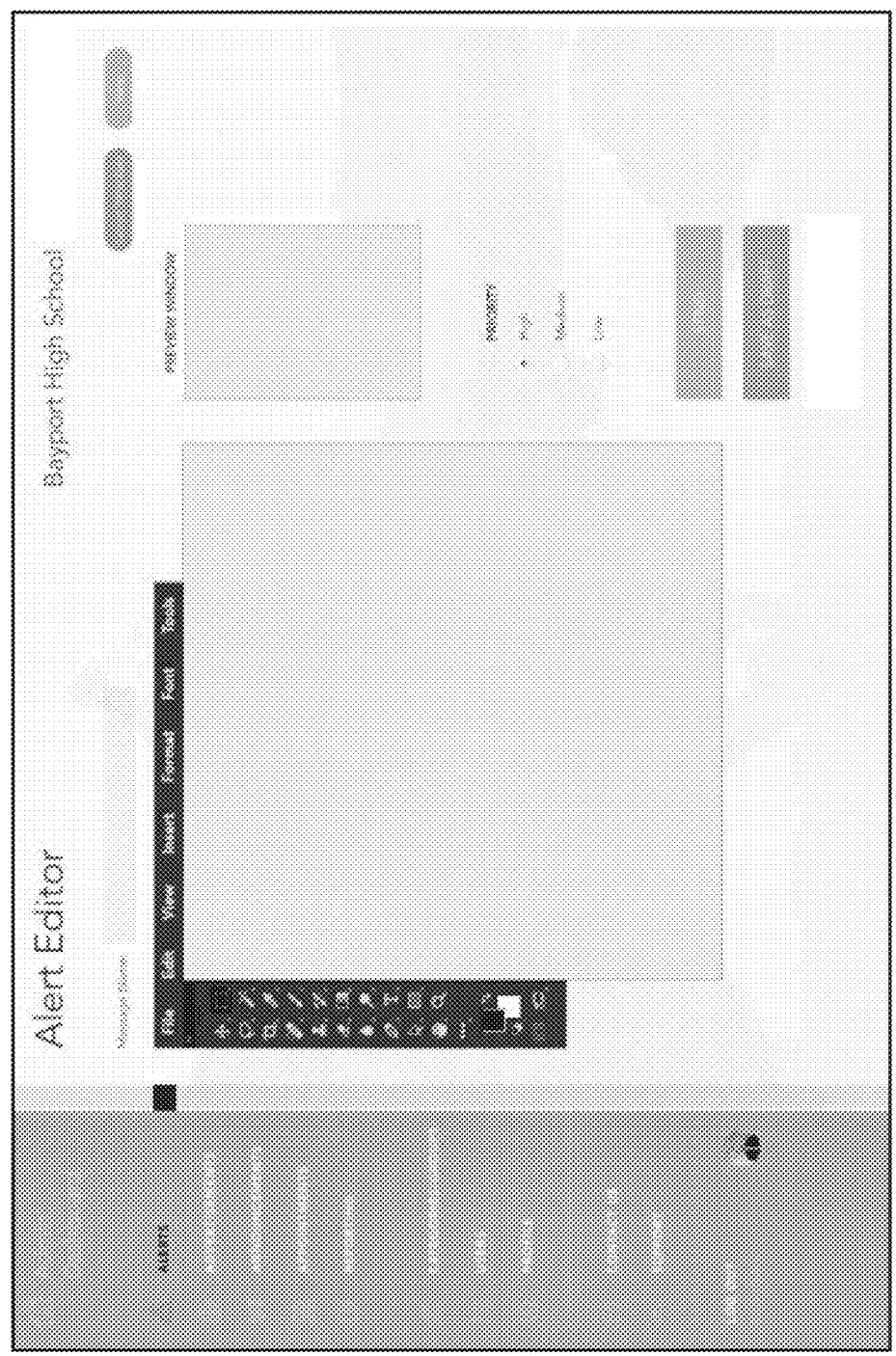
FIG. 17 shows a graphical user interface (GUI) of the software relating to alerts, for use by a subscriber/administrator.
Figure 18:
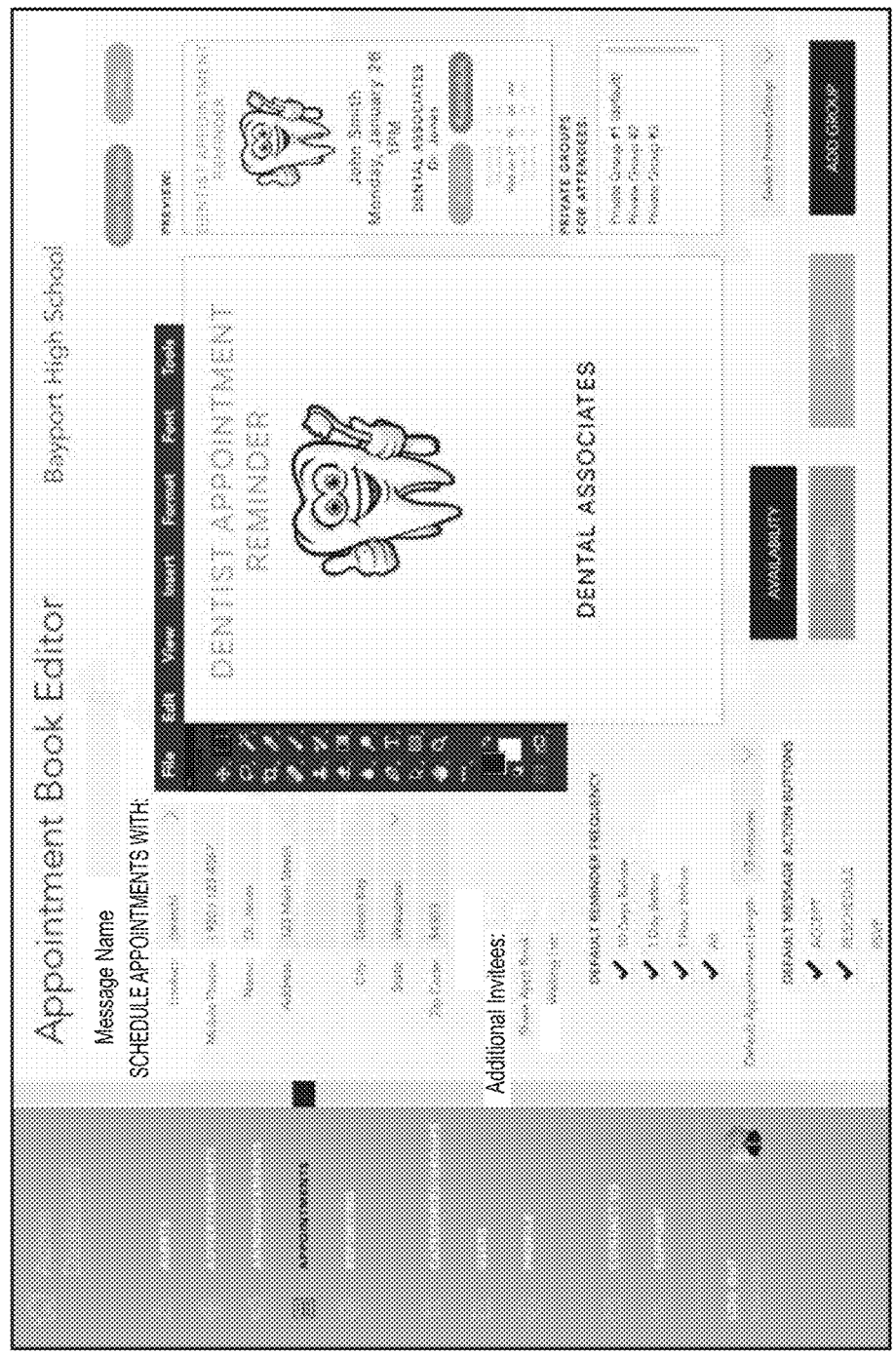
FIGS. 18, 19, and 20 show graphical user interfaces (GUIs) of the software relating to appointments, for use by a subscriber/administrator.
Figure 19:
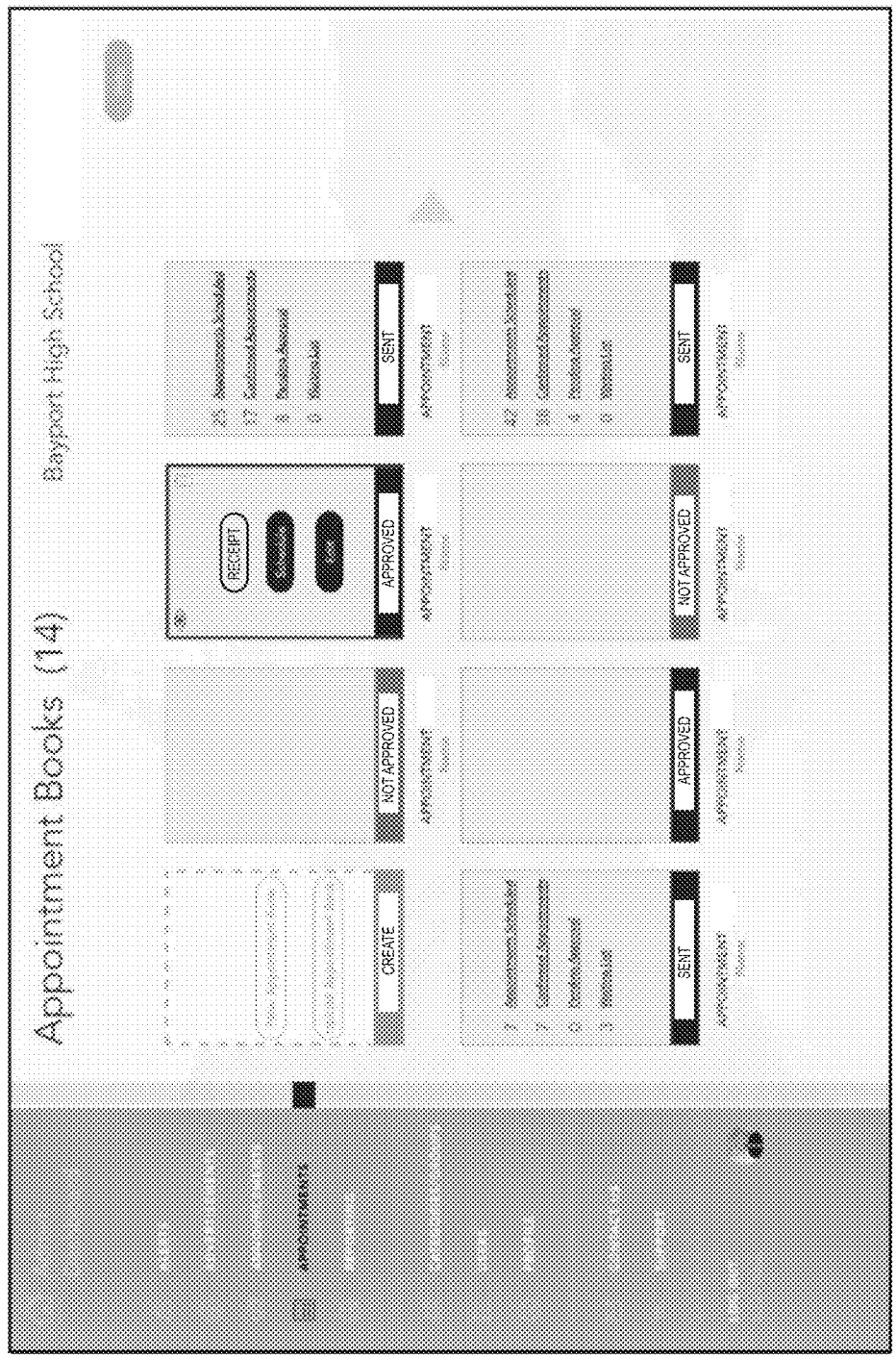
Figure 20:
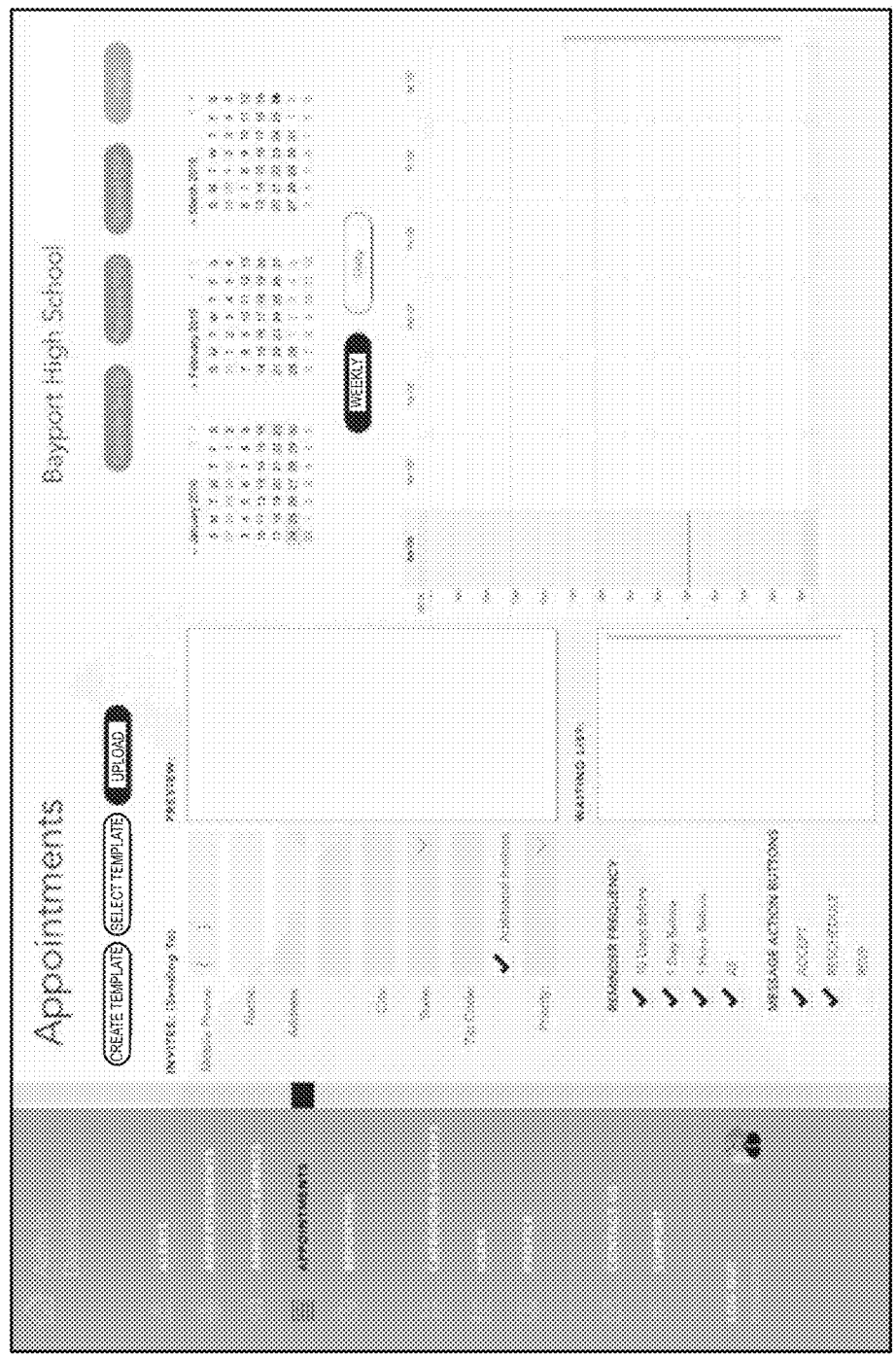
Figure 21:
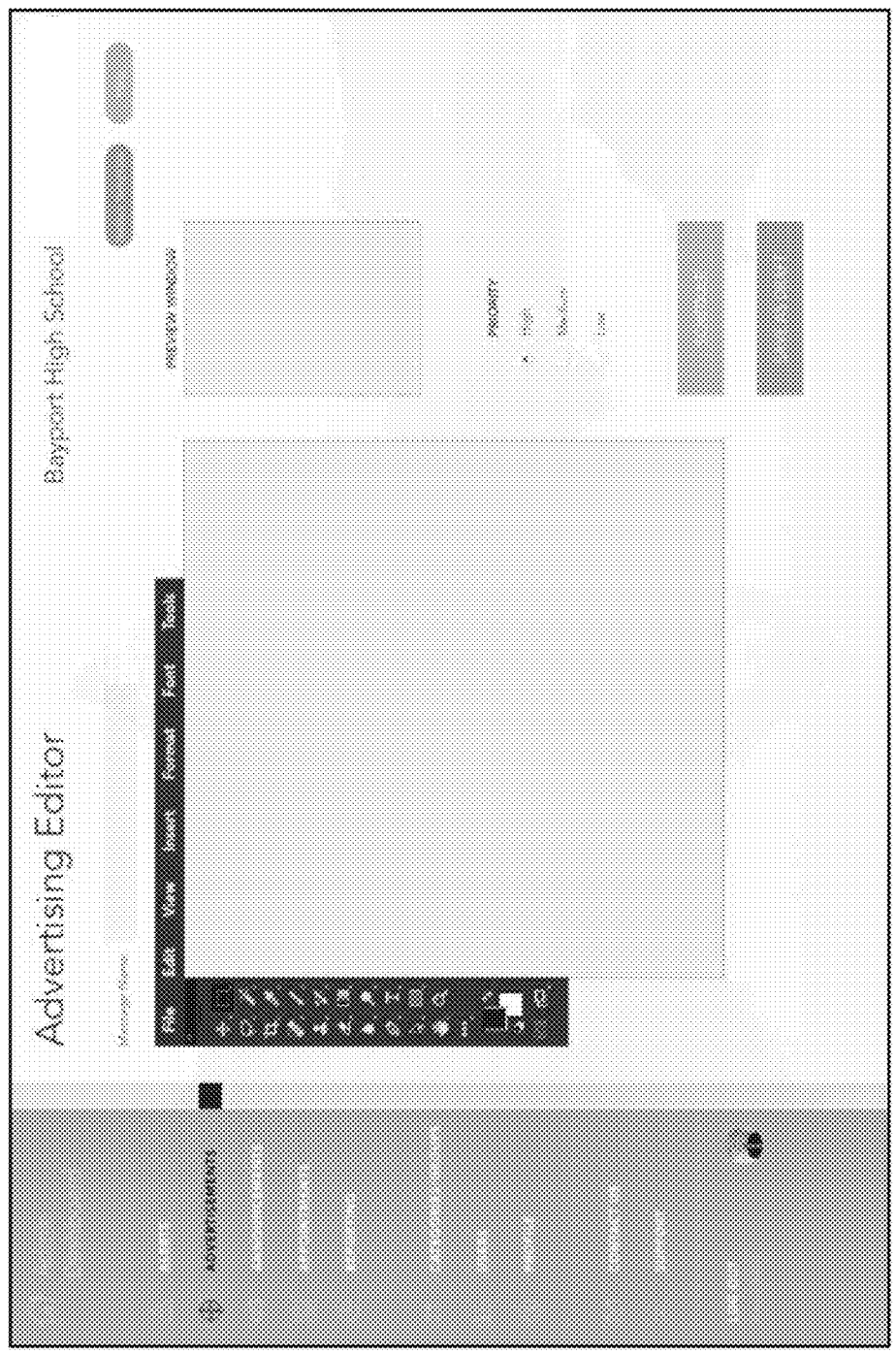
FIG. 21 shows a graphical user interface (GUI) of the software relating to advertisements, for use by a subscriber/administrator.

FIG. 16 shows a GUI of the messaging software relating to an announcement editor, for use by a subscriber/administrator for the purpose of creating an announcement-type graphic-based message. FIG. 17 shows a GUI of the software relating to an alert editor, for use by a subscriber/administrator for the purpose of creating an alert-type graphic-based message. FIGS. 18, 19, and 20 show GUIs of the software relating to appointments, for use by a subscriber/administrator in creating appointment-type graphic-based messages. FIG. 21 shows a GUI of the software relating to an advertisement editor, for use by a subscriber/administrator for the purpose of creating an advertisement-type graphic-based message.

Figure 22:
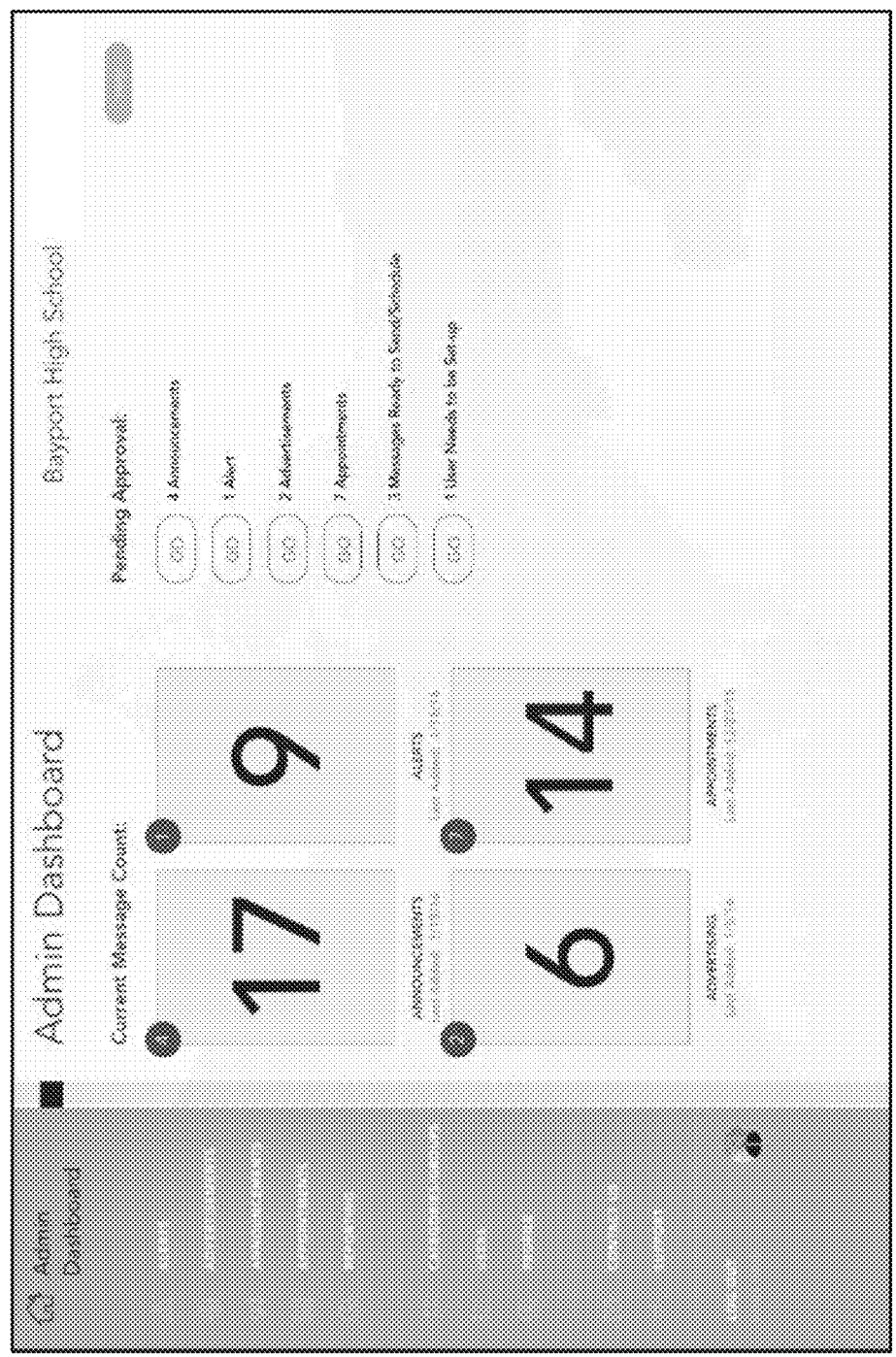
FIGS. 22, 23, 24, 25A, 25B, 26, and 27 show additional graphical user interfaces (GUIs) of the software for use by a subscriber/administrator.
Figure 23:
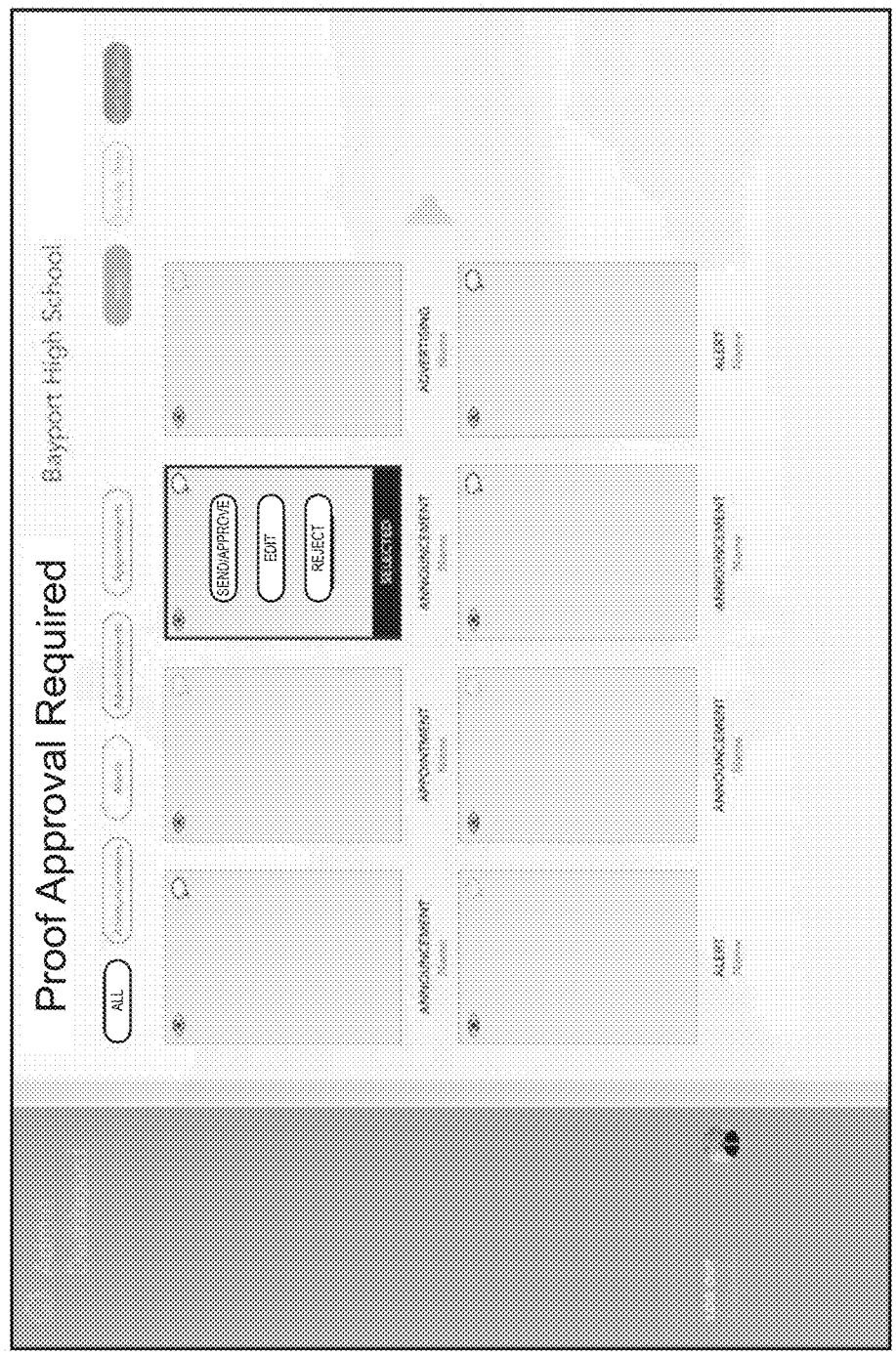
Figure 24:
Figure 25A:
Figure 25B:
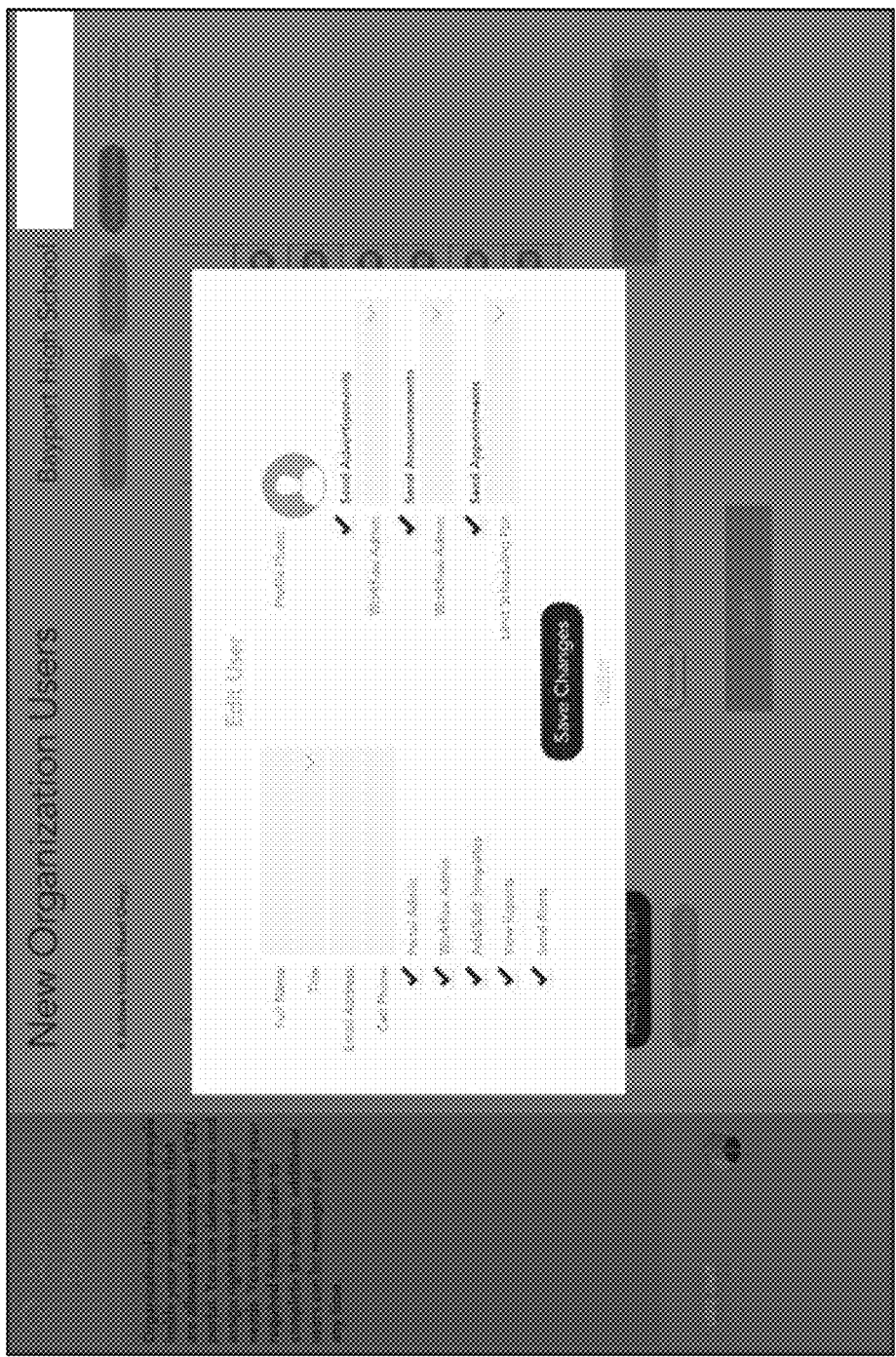
Figure 26:
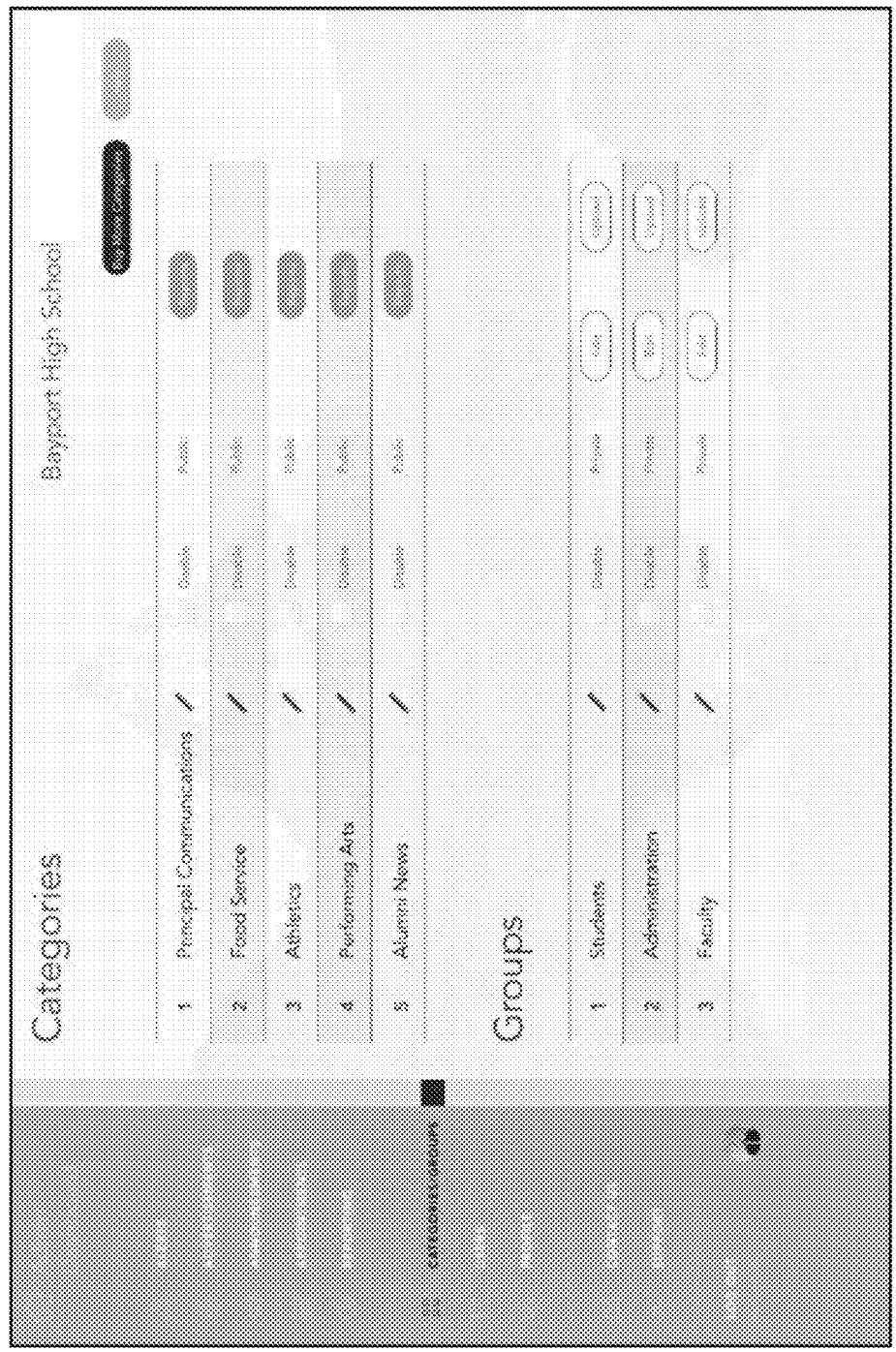
Figure 27:
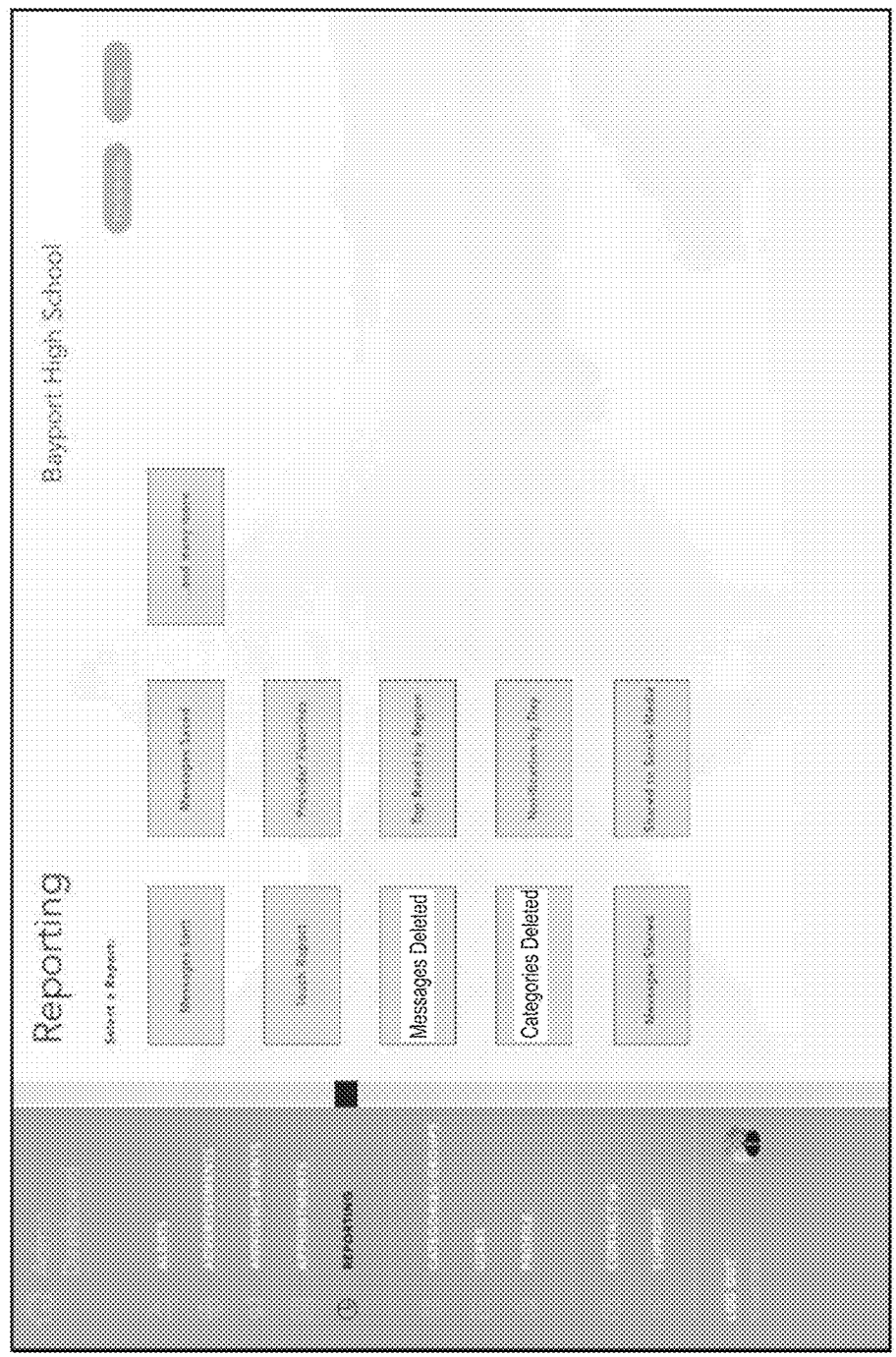

FIGS. 22 through 27 show additional GUIs of the software for use by a subscriber/administrator. FIG. 22 shows an administrative dashboard, e.g. for use by a portal administrator of a subscriber. This dashboard provides a count of the total number of announcements (17), alerts (9), advertisements (6), and appointments (14) that have been created by the subscriber, as well as the number of those message types that are pending approval by the administrator (announcements—4, alerts—1, advertisements—2, appointments—7). FIG. 23 shows an administrative page illustrating how a given message that is pending approval, such as an announcement, can be selected and processed by the administrator by selecting an action from the defined options of Send/Approve, Edit, and Reject. FIG. 24 shows an administrative page illustrating profile information on the subscriber-user, in this case a subscriber group (a high school). FIG. 25A shows an administrative page that lists and summarizes new subscriber-users who are part of a subscriber group or organization (a high school). FIG. 25B shows an administrative page that appears when the administrator undertakes to edit administrative aspects of a particular subscriber-user. FIG. 26 shows an administrative page that lists available categories for associating with graphic-based messages, and also lists available user groups. FIG. 27 shows an administrative page that lists reports generated by the messaging software for the subscriber, including Messages Sent, Messages Saved, Touch Report, Provider Favorites, Messages Deleted, Top Rated by Region, Categories Deleted, Notification by Day, Messages Shared, and Shared to Social Media.

Additional Software Features

Additional features of the messaging software, some of which are mentioned or discussed elsewhere in this document, will now be further described.

Information Flow Method

After creating a graphic-based (infographic) message, the subscriber-user sends the message through a cloud-based server, and from there to a specific NS user who has elected to follow the subscriber. Transmission of the message is by the digital data channel of a conventional cellular communications network, rather than by Short Messaging Service (SMS) communications channels.

Print Function

This function prints the downloaded graphic-based message, which is not the same as a screen shot, or the "print screen" function on a conventional desktop or laptop computer. From the "Menu" function (see e.g. the lower left corner of the message of FIG. 9), the user selects "print", whereupon a print menu appears, showing a list of available physical and/or virtual printer options, including e.g. any WiFi-connected printers. The user then selects "print" from this menu. In response, the actual post—i.e., the graphic-related message that has been posted or delivered to the NS user—prints to any of the available printers, without including in the printed image the standard message border (bordered template).

The print function may be for mobile devices from an automatically downloaded graphic-based message in the form of a display (graphic-based message) wallpaper. Many users of devices such as smart phones and tablets utilize a wallpaper. This image may come pre-loaded or standard with the device, or it may be a photograph or other image that has been user-supplied. Alternatively, the wallpaper or lock screen image may originate from a subscriber service such as the messaging software described herein, wherein images (in the form of graphic-based messages) originating from a central location are automatically downloaded to a user's mobile device as described throughout this document. These images (messages) may include scenic, artistic, advertising, alerts, appointments, and so forth.

The print screen function on conventional computers does not encompass or capture the wallpaper or lock screen images of the computer. In contrast to this, the disclosed software may include a capability to print the image from a subscriber-based downloaded wallpaper or lock screen image, such as any of the disclosed graphic-based messages. A mobile device receives such an image by downloading, such that the image appears on the mobile device screen.

Visible on the image, and located in an appropriate location on the screen, is a virtual "print" button. Touching or otherwise activating this button activates the necessary program code for printing, and opens the "print" menu whereby the user chooses the available printer options. Using a WiFi-enabled printer or a suitable wired connection, such as a USB cable, from the device to the printer, the image is sent to the printer for printing. The software programming code necessary to accomplish this functionality can be made available for download onto the user's smart phone or similar device. Reference is made herein to U.S. Patent Application U.S. Ser. No. 62/247,152, filed Oct. 27, 2015.

Re-Schedule Appointment Feature

With this feature, a subscriber sends an appointment-type graphic-based message to an NS user using the calendar control. The message defines an "accept" and a "reschedule" virtual button from which the NS user can choose. If the NS user selects "reschedule", the messaging software offers to re-schedule from a given number (e.g. 3) of alternative or secondary appointment times (or time slots), and the NS user can then choose from those secondary times, and confirm the selection with subscriber.

This feature provides alternative date offerings within the framework of a digital appointment scheduling system. Upon selecting the "reschedule" function, a predetermined number (e.g. 3) of alternative or secondary openings are generated for the NS user to choose from. The user may accept one of the secondary openings, or may again select "reschedule", whereupon a predetermined number (e.g. 3) of alternative or tertiary openings will be offered. The number of times an NS user may select the reschedule function is set by the administrator of the scheduling system.

Define Graphical Template Feature

A subscriber-user can add or apply rules and definitions to a graphic-based message template, including graphics, audio content, hyperlinks, as well as a recipient list, one or more designated dates and times to send the message, frequency, content, and others. The defined templates created are "active."

A Means to Define a Template Ready to Send

A subscriber-user can set up a graphic-based message template to be ready to send quickly, on short notice. The definitions can be broad or narrow. Settings may include, for example: High, Medium, and Low Priority; a recipient list; one or more designated dates and times to send the message; graphics on the template; and frequency.

Message Approval Feature

After a graphic-based message has been created and defined by an original creator/editor (user preference), the message is sent to a workflow administrator (user preference) for final approval. Dependent on the user preference, the creator of the message may also be the administrator for that type of message.

Notification Image (Visual Addition to Notification)

Text-based notifications of new content received on a mobile device are known. In the new approach, a semi-transparent readable image of the new content is included in addition to the text-based notification a user receives. The addition of the semi-transparent image allows a user to better determine through a secondary method if the new content needs to be addressed immediately.

Share Feature Contact Highlighting

When a user activates the "share" button, the workflow of the software presents the user with the phone contacts list resident in the memory of the smart phone or other device being used. The user may then choose which entries or contacts on the list they wish to share the message with. For easy reference, the messaging software differentiates each of the contacts in the list that are current users of the messaging software in some way, such as by highlighting, shading, underlining, change in font color, size, capitalization, or other characteristic, use of asterisks, or other suitable visual effects. In the event the user shares the message with a contact who is not a user of the messaging software, such contact or recipient will first receive an email, and then a text stating they have information from the user, along with a URL link to receive the messaging software or additional information. Reference is made herein to U.S. Patent Application U.S. Ser. No. 62/246,576, filed Oct. 26, 2015.

Touch Statistics Feature

During use and engagement with the messaging software, an NS user will "touch" or activate options associated with the graphic-based message on the phone/tablet screen. The user may for example touch virtual buttons or functions via the screen such as delete, save, share, remove A, explore, slide, dialed, accepted, rescheduled, and RSVP. The software may keep an electronic record of counts or other statistical data relating to the user's touches of such functions, and may provide such statistical data to one or more of the subscriber-users.

Un-Follow Category Feature

Within the framework of the disclosed messaging software, NS users are able to follow the posts (graphic-based messages) of any given subscriber of interest to the NS user. The subscriber has the ability to establish specific more defined categories that can be tagged to the subscriber's messages, and that NS users may choose to follow. Users may choose to follow all the posts (messages) from all such categories, or they may choose only a limited number of such categories. Within a specific category a user receives, there may be content that does not interest them. In this situation, the user may choose to ignore such messages, or they may choose to delete the messages using the delete function. When a user selects the delete function for a given message category with a specified count or frequency, e.g., three separate uses of the delete function for messages having the given message category, the software may prompt or query the to ask if the user wishes to remove the category from the feeds the user receives. If the user is only temporarily disinterested in the specific category at issue, the user may later resume receiving messages tagged with that specific category by, for example, selecting "follow" from the entities main page. In addition to the NS user being able to temporarily suspend receiving messages tagged with the specific category, this information can also become feedback data available to the subscriber or other message-issuing entity.

Figure 28:
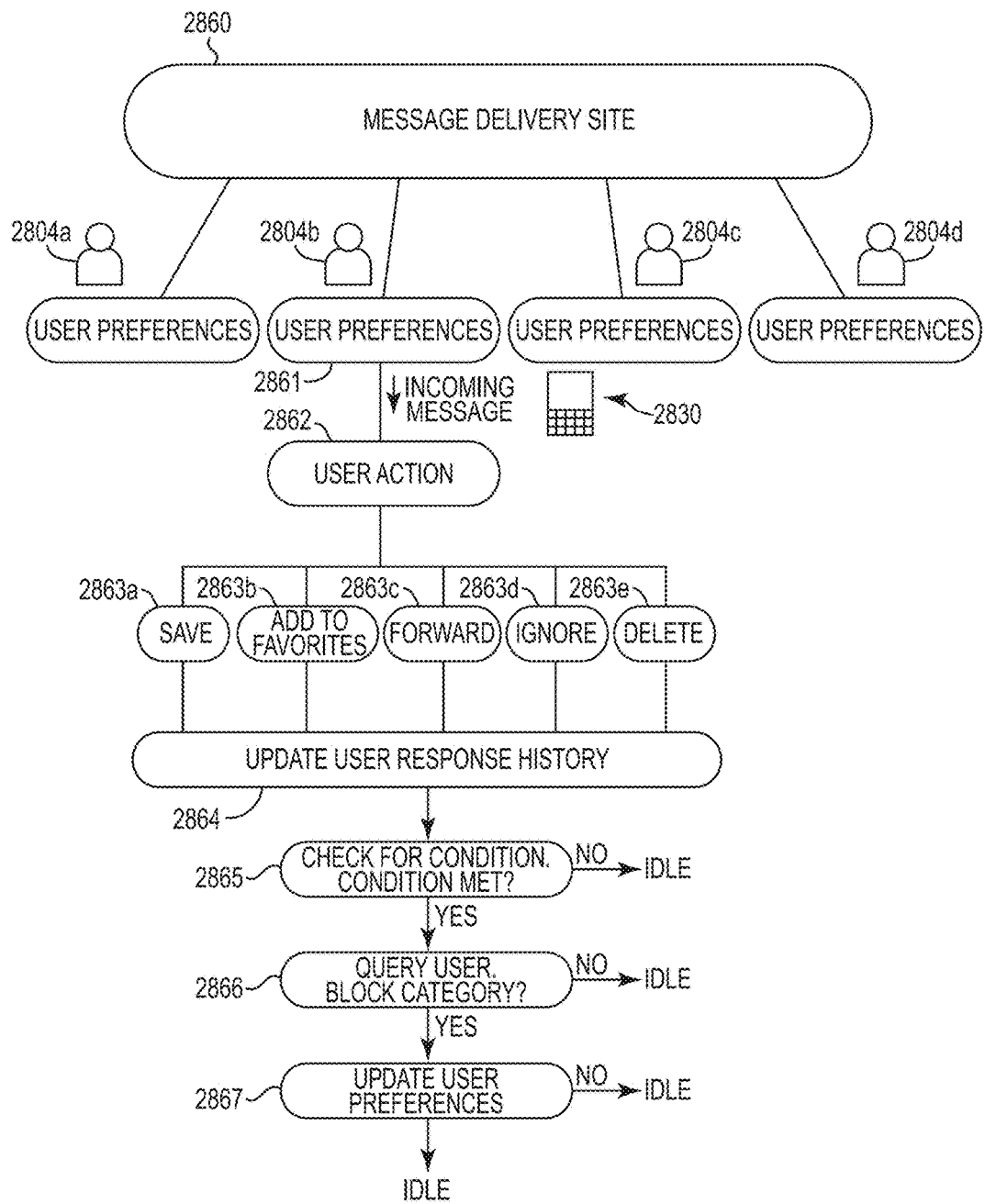
FIG. 28 is a flow diagram illustrating a software feature that automatically queries or prompts a user to block or unfollow a predefined category of messages.

FIG. 28 is a flow diagram that illustrates this software feature, which can automatically query or prompt a user to block or unfollow a predefined category of messages. In the figure, a message delivery site is defined by the software as a repository for subscriber-generated messages. The software connects NS users to this site, such as NS users 2804*a-d*. Each of these users has a defined set of user preferences which determine which messages in the message delivery site the software will deliver to the users. In the embodiment of FIG. 28, user preferences 2861 of NS user 2804*b* include a setting that causes a graphic-based message 2830 to be delivered to the electronic device of the user 2804*b*. At step 2862, the user 2804*b* takes an action with respect to the message 2830, such as saving 2863*a*, adding to favorites 2863*b*, forwarding 2863*c*, ignoring 2863*d*, or deleting 2863*e* the message. At step 2864, after taking one of these actions, the software updates the user response history. At step 2865, the software checks to see if a specified condition has been met. The condition may be or include a comparison of one or more statistic of the user response history to a specified threshold. For example, the statistic may be the number of times the user has deleted messages that were tagged with the specific message category, and the threshold may be a fixed number such as 2 or 3 or 4. If the condition is not met, workflow passes to an idle state, with no change made to the user preferences 2861. If the condition is met, workflow passes to a step 2866, where the software initiates a query to the user, asking the user 2804*b* if they wish to block or otherwise stop receiving messages tagged with the specific message category. If the user answers "no", workflow passes to an idle state, with no change made to the user preferences 2861. If instead the user answers "yes", workflow passes to step 2867, wherein the messaging software automatically updates the user preferences 2861 to change a setting that relates to the specific message category, such that future messages tagged with such message category and added to the message delivery site are no longer delivered to the user 2804*b*.

Figure 29:
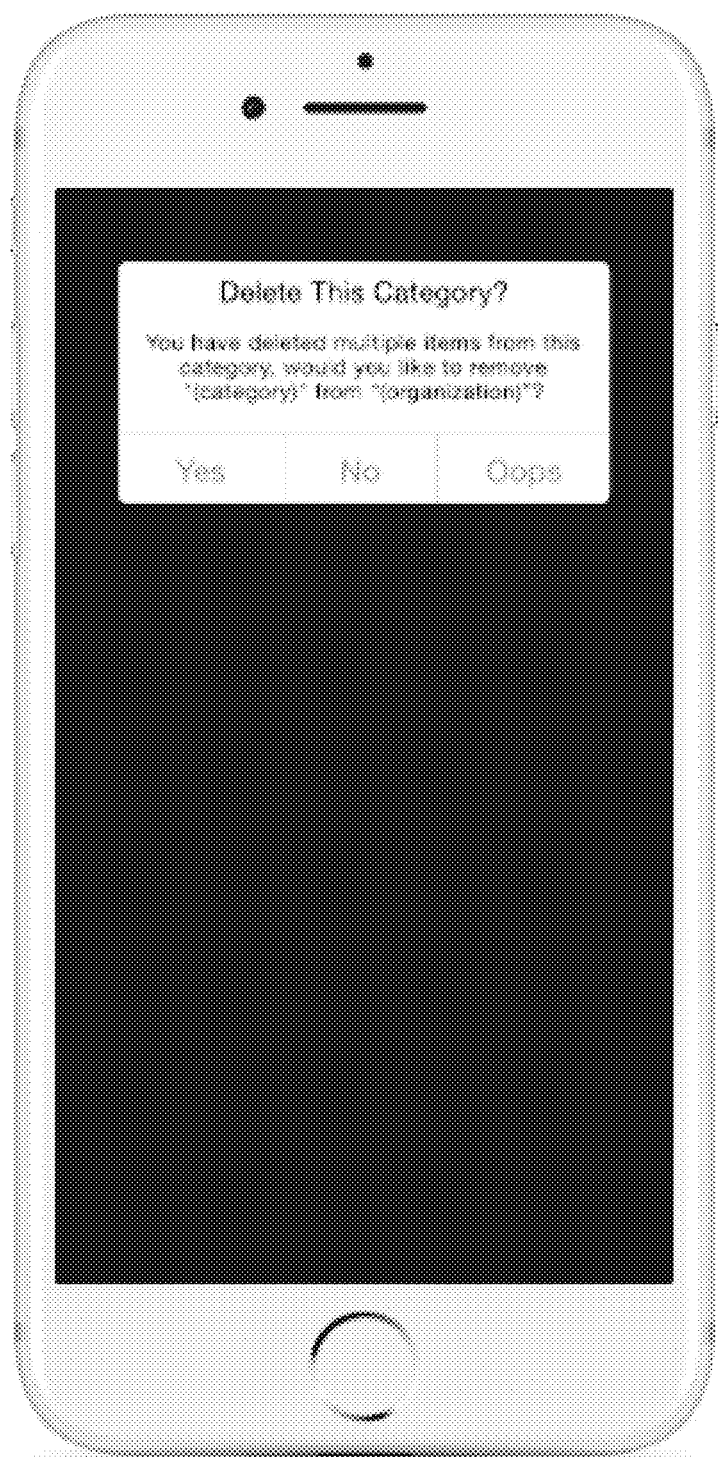
FIG. 29 shows an image of a smart phone with such an unfollow category query.

FIG. 29 shows an image of a smart phone with an unfollow category query, such as that associated with step 2866 of FIG. 28.

Reminder Function

Figure 30:
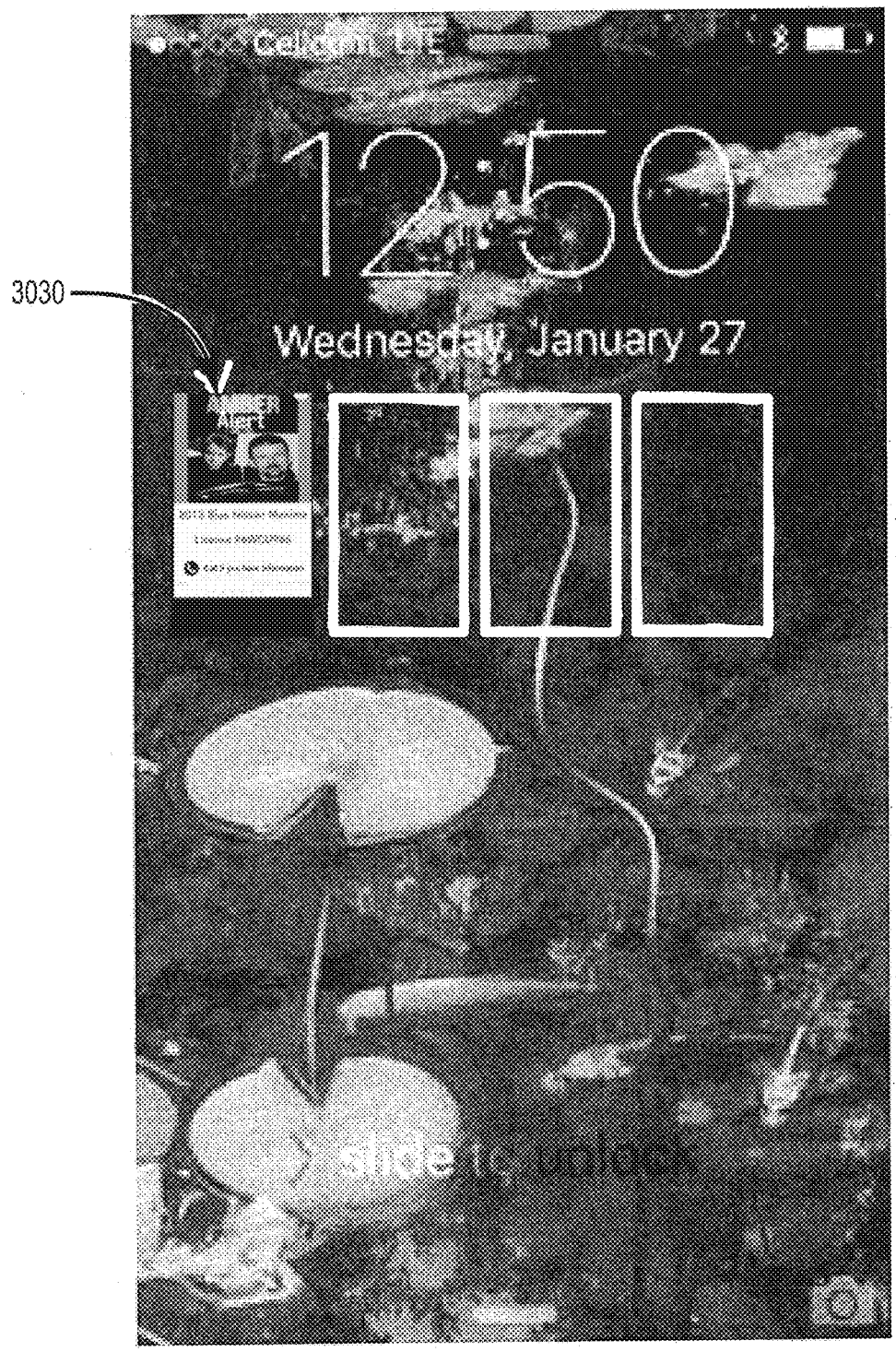
FIG. 30 shows a graphical user interface (GUI) of the software for a smart phone relating to a remind feature of the software.

While using the messaging software, an NS user may wish to be reminded of a message currently being viewed. In this case, the user may tap the "menu" button, which brings up a "remind" function, among other possible functions. The user may then tap on the "remind" button or function, which prompts the software to initiate the following sequence of events:

- A screen shot or other image of the message being viewed is captured and reduced in size, e.g., scaled down to about 65% of the original size. Refer to reduced image 3030 in FIG. 30.
- A copy of the existing lock screen is taken. This would likely be based upon the image ID number associated with it. If it isn't the users photo, the image ID from the phone stock images may be used.
- Using a predefined template, the image to be "reminded"—i.e., the scaled-down image—is placed into one of the four areas available. These template areas are the designated locations for the "remind" images to be placed. Examples of such template areas can be readily identified as the white-outlined regions in FIG. 30. The scaled-down reminder images may take the place of the image currently within the template area (existing lock screen), or they may be overlaid onto the existing lock screen in these areas.
- The newly created lock screen would then replace the previously-defined (standard) lock screen.

To erase a "remind" image, the user may navigate to the original lock screen image, or navigate to the "menu" function and tap the "remind" feature, or send the original to "trash". When additional messages are processed by the "remind" function, the existing image including any scaled-down "remind" images are used as the current lock screen.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A computer-implemented method of delivering graphic-based messages from one or more subscriber-users to a non-subscriber user of a messaging software system, the method comprising:
    defining a predetermined set of message categories;
    associating graphic-based messages created by the one or more subscriber-users with one or more of the message categories;
    defining user preferences for the non-subscriber user, including designating at least a first message category from the set of message categories that the non-subscriber user wishes to receive;
    monitoring the non-subscriber user's responses to graphic-based messages received by the non-subscriber user in relation to at least some of the message categories in the predetermined set;
    in response to a plurality of negative actions of the non-subscriber user relative to received graphic-based messages in the first message category, querying the non-subscriber user regarding whether the non-subscriber user wishes to continue receiving graphic-based messages in the first message category; and
    when the non-subscriber user responds to the query by indicating the non-subscriber user does not wish to continue receiving graphic-based messages in the first message category, revising the user preferences to remove the first message category from the set of message categories that the non-subscriber user wishes to receive;
    wherein the defining, associating, monitoring, querying, and revising are carried out at least in part by software resident on one or both of a portable electronic device and a distributed networking device.

2. The method of claim 1, wherein the graphic-based messages have digital file sizes of 40 to 80 kilobytes.

3. The method of claim 1, wherein the graphic-based messages include one or more of audio content, video content, and hyperlink content.

4. The method of claim 1, wherein the graphic-based messages comprise one or more of announcements, alerts, appointments, and advertising.

5. The method of claim 1, wherein the graphic-based messages are configured to appear as a full wallpaper image when delivered to a smart phone.

6. The method of claim 1, wherein the graphic-based messages are transmitted on a data channel of a cellular communications network.

7. The method of claim 1, further comprising limiting access for who can generate and send the graphic-based messages to the one or more subscriber-users.

8. The method of claim 1, wherein the non-subscriber user is a member of a closed group of non-subscriber users managed by the one or more subscriber-users.

9. The method of claim 1, wherein the monitoring the non-subscriber user's responses includes maintaining a statistical measure of such responses.

10. The method of claim 1, wherein the associating includes encoding information relating to the one or more message categories in a metadata portion of the graphic-based messages.

11. The method of claim 1, wherein the defining, associating, monitoring, querying, and revising are carried out at least in part by software resident on the portable electronic device, and the portable electronic device is a smart phone.

12. The method of claim 1, wherein the defining, associating, monitoring, querying, and revising are carried out at least in part by software resident on the distributed networking device, and the distributed networking device includes a computer server.

13. The method of claim 1, wherein the software defines a hub having sufficient memory storage capacity to store the graphic-based messages.

14. The method of claim 1, wherein the one or more subscriber-users includes a plurality of subscriber-users, and wherein the non-subscriber user is communicatively connected to the plurality of subscriber-users via a communications network infrastructure.

15. The method of claim 14, wherein the communications network infrastructure includes at least one of a cellular network and a world wide web.

16. The method of claim 1, wherein the non-subscriber user is one of a plurality of non-subscriber users, and the plurality of non-subscriber users are communicatively connected to each other via a communications network infrastructure.

17. The method of claim 16, wherein the plurality of non-subscriber users and the one or more subscriber-users are affiliated with an educational institution.

18. The method of claim 17, wherein the predetermined set of message categories includes a category for alerts including at least one of lockdowns and threats.

19. A computer-readable storage medium having instructions that, when executed by an electronic device having a visual display, a user input device, and a processor, cause the electronic device to perform operations comprising:

delivering graphic-based messages from one or more subscriber-users to a non-subscriber user;

defining a predetermined set of message categories;

associating graphic-based messages created by the one or more subscriber-users with one or more of the message categories;

defining user preferences for the non-subscriber user, including designating at least a first message category from the set of message categories that the non-subscriber user wishes to receive;

monitoring the non-subscriber user's responses to graphic-based messages received by the non-subscriber user in relation to at least some of the message categories in the predetermined set;

in response to a plurality of negative actions of the non-subscriber user relative to received graphic-based messages in the first message category, querying the non-subscriber user regarding whether the non-subscriber user wishes to continue receiving graphic-based messages in the first message category; and when the non-subscriber user responds to the query by indicating the non-subscriber user does not wish to continue receiving graphic-based messages in the first message category, revising the user preferences to remove the first message category from the set of message categories that the non-subscriber user wishes to receive.

20. The storage medium of claim 19, wherein the non-subscriber user is one of a plurality of non-subscriber users, and the plurality of non-subscriber users are communicatively connected to each other via a communications network infrastructure, and the plurality of non-subscriber users and the one or more subscriber-users are affiliated with an educational institution.

21. The storage medium of claim 20, wherein the predetermined set of message categories includes a category for alerts including at least one of lockdowns and threats.

\* \* \* \* \*